United States Patent
Chute et al.

(10) Patent No.: US 12,437,323 B2
(45) Date of Patent: Oct. 7, 2025

(54) INTEGRATING PRIVATE RESERVATIONS WITH PUBLICLY-OFFERED TICKETED RESERVATIONS

(71) Applicant: Airbnb, Inc., San Francisco, CA (US)

(72) Inventors: Benjamin Chute, San Francisco, CA (US); Eric Ertmann, San Francisco, CA (US); Andrew Hunt, San Francisco, CA (US); Kristen Jaber, San Francisco, CA (US); Mojtaba Mehrara, San Francisco, CA (US); Pauline Nguyen, San Francisco, CA (US); James Ostrowski, San Francisco, CA (US); Gabriel Radovsky, Los Angeles, CA (US); Yunshan Weng, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 895 days.

(21) Appl. No.: 16/830,242

(22) Filed: Mar. 25, 2020

(65) Prior Publication Data
US 2021/0304264 A1    Sep. 30, 2021

(51) Int. Cl.
G06Q 30/0283    (2023.01)
G06F 16/23       (2019.01)
G06Q 10/02       (2012.01)

(52) U.S. Cl.
CPC ..... *G06Q 30/0283* (2013.01); *G06F 16/2379* (2019.01); *G06Q 10/02* (2013.01)

(58) Field of Classification Search
CPC . G06Q 10/02; G06Q 30/0283; G06F 16/2379
See application file for complete search history.

(56) References Cited

U.S. PATENT DOCUMENTS

| | | | |
|---|---|---|---|
| 2010/0115113 A1* | 5/2010 | Short | H04L 12/22 |
| | | | 709/228 |
| 2013/0090959 A1* | 4/2013 | Kvamme | G06Q 10/02 |
| | | | 705/5 |

(Continued)

OTHER PUBLICATIONS

L. Zekanovic-Korona and J. Grzunov, "Evaluation of shared digital economy adoption: Case of Airbnb," 2014 37th International Convention on Information and Communication Technology, Electronics and Microelectronics (MIPRO), Opatija, Croatia, 2014, pp. 1574-1579, doi: 10.1109/MIPRO.2014.6859816. (Year: 2014).*

*Primary Examiner* — Rupangini Singh
*Assistant Examiner* — Tayar M Kyu
(74) *Attorney, Agent, or Firm* — Morgan, Lewis & Bockius LLP

(57) ABSTRACT

The present disclosure relates to the implementation of a pricing structure for the private booking of travel experiences. An experience is offered publicly, so as to be bookable by a plurality of customers, each customer booking a subset of a number of available slots for attendees. A customer may convert the experience from a public experience to a private experience by paying at least a minimum price for the private booking. Where the per person cost would exceed the minimum price, the customer pays an additional per guest value. A plurality of differing pricing rules may be applied in correspondence based on the respective numbers of different types of guests attending the event, or differing date/time instances of the experience.

18 Claims, 10 Drawing Sheets

(56) References Cited

U.S. PATENT DOCUMENTS

| | | | | |
|---|---|---|---|---|
| 2014/0108070 A1* | 4/2014 | Vernitsky | ............. | G06Q 10/025 |
| | | | | 705/6 |
| 2014/0245459 A1* | 8/2014 | Ortiz | .................. | G06F 21/6218 |
| | | | | 726/28 |
| 2015/0154514 A1* | 6/2015 | Hall | ....................... | G06Q 10/06 |
| | | | | 705/5 |
| 2017/0178034 A1* | 6/2017 | Skeen | ................ | H04N 21/4825 |

* cited by examiner

390

Edit Experience
Pricing details

Pricing Rule 1

Date/Time:        Monday-Friday, 9am – 5pm

Guest Type:      Adults, Children, Seniors

Price per guest:   $40.00

370

375 ( Add Pricing Rule )

New Pricing Rule – Pricing Rule 2
380

Date/Time

382

Days: ☐ Mon ☐ Tue ☐ Wed ☐ Thu ☒ Fri ☒ Sat ☒ Sun

Start time: [5:00pm ▼]   End time: [9:00pm ▼]
                                                    8:00pm
                                                   9:00pm
                                                   10:00pm
                                                   11:00pm

Public Bookings

310-1  Guest Type 1: [Adults ▼]   310-2

Maximum of guests units per instance: [10]

Price per guest: [$0.00]   312-1

310-3  Guest Type 2: [Pets ▼]      312-2

Maximum of guests units per instance: [30]

Price per guest: [$60.00]

312-3

315 ( Add Guest Type )

Private Bookings

320  Allow guests to book events privately? [Yes ▼]

322  Auto book private bookings or contact me upon request? [Auto book ▼]

324  Allow Guests to contact me about off schedule private bookings? [Yes ▼]

326  Set separate pricing for off schedule private bookings? [Yes ▼]

6 timeslots available
For Sep 29 – Oct 5

Guests    Time of Day    Clear Dates

Sun, Sep 29
10:00 AM – 12:00 AM
$60 per person
Book for a private group ⓘ    Select Sun, Sep 29
1:00 PM – 3:00 AM
$60 per person
Book for a private group ⓘ    Select Mon, Sep 30
10:00 AM – 12:00 AM
$60 per person
2 of 10 spots left    Select

SEARCH FOR EXPERIENCES            Login / Sign Up

ADDRESS 🔍                    ✕

FILTERS  Dates/Times  Guests  Price  Language    ✕

SEARCH RESULTS            500 results

Bluegrass Music

Beach Yoga

Urban Hike

Wine Tasting

Review and pay

You're booking this entire experience for a private group. Spots will only be available to you and your guests Number of guests — 510
[ 1 ▶ ]
[ ▶ ]

Guest type — 512
[ Adult ▶ ]
[ ▶ ]

Sun, Sep 29 — 515
10:00 AM – 12:00 AM
Photo Tour of D.C. Monuments — 520

Private group price ............ $200
Additional Costs [if applicable] .... $0 — 530

Total (USD) ................. $200 — 560

[ Cancel ] — 540    [ Confirm ] — 550

Review and pay

You're booking this entire experience for a private group. Spots will only be available to you and your guests Number of guests — 510
[ 2 ▶ ]
[ ▶ ]

— 512
[ Adult ▶ ]
[ ▶ ]

Sun, Sep 29 — 515
10:00 AM – 12:00 AM
Photo Tour of D.C. Monuments — 520

Private group price ............ $200
Additional Costs [if applicable] .... $0 — 530

Total (USD) ................. $200 — 560

[ Cancel ] — 540    [ Confirm ] — 550

500

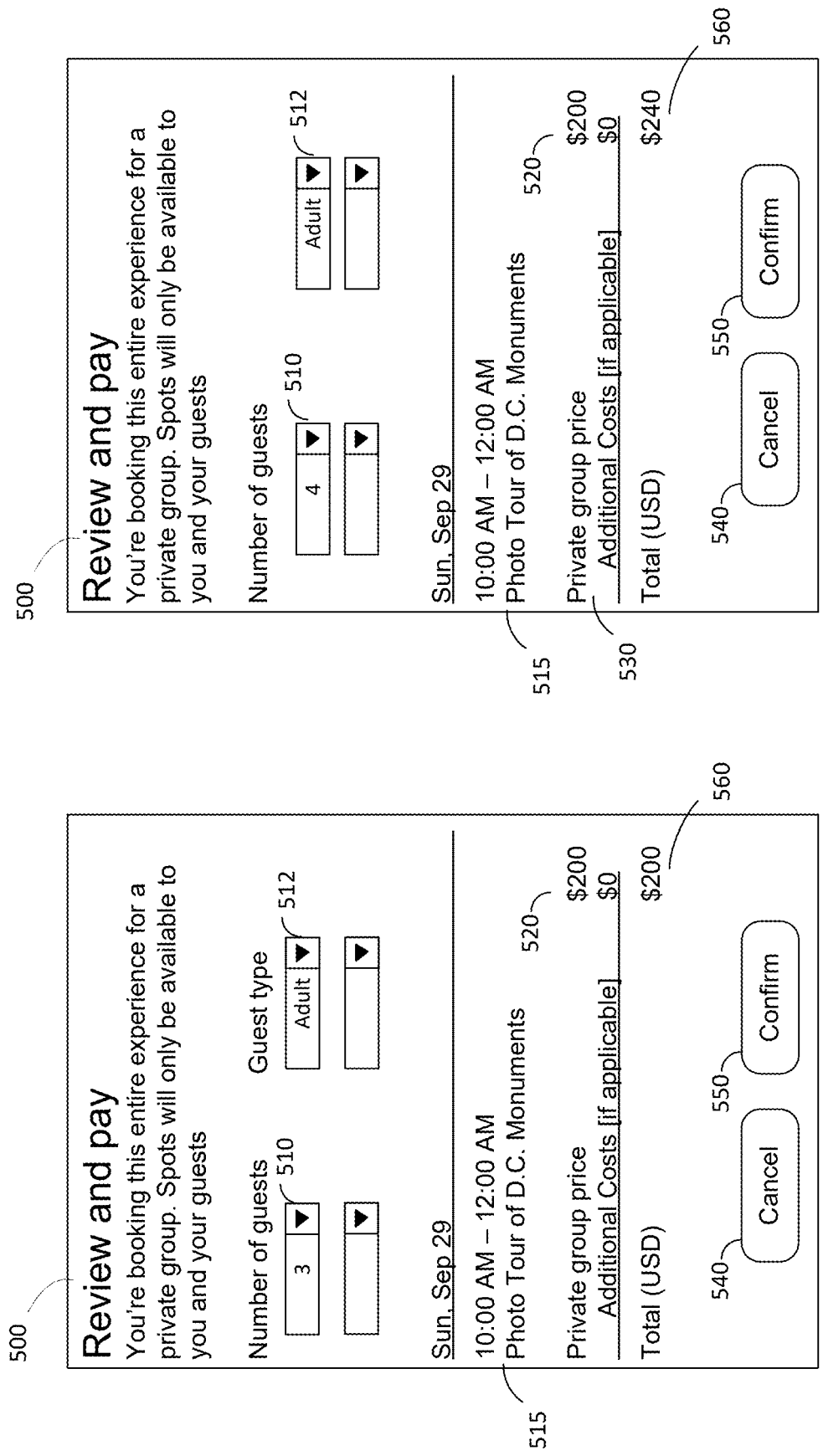

INTEGRATING PRIVATE RESERVATIONS WITH PUBLICLY-OFFERED TICKETED RESERVATIONS

RELATED ART

E-commerce systems may allow individuals or groups to purchase tickets to experiences or events managed by different vendors, such as tickets to movies, concerts, tours, amusement parks, and other activities. Online ticketing systems may allow for the purchase of a group of tickets to a particular activity as a block, so that guests may attend together. In some cases, large groups can contact the vendor ahead of time to negotiate a group rate for a block of tickets to reserve an entire vendor facility for exclusive use by a single group of people. For example, buses, boats, and planes may be chartered or restaurants or hotels may be reserved for private events and usage.

In conventional solutions, consumers purchasing tickets through an e-commerce site purchase one ticket per attendee. A consumer wishing to book a private or exclusive event may be required to purchase a number of individual tickets equivalent to the actual maximum capacity of the event in order to prevent others not from the consumer's group from attending the event. Such a solution is prohibitively expensive for most consumers. In many situations, the consumer is unaware or unsure of whether there is a maximum capacity for the event, or what that capacity may be, and therefore cannot be confident that their reservation will be truly private despite their attempts to book out the event. Additional solutions allowing e-commerce systems to facilitate the reservation of private experiences are therefore generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIGS. 3A, 3B, and 3C are exemplary user interfaces for editing pricing rules for a reservable experience in accordance with some embodiments of the present disclosure.

FIGS. 4A and 4B are exemplary user interfaces for selecting a reservable experience in accordance with some embodiments of the present disclosure.

FIGS. 5A, 5B, 5C, and 5D are exemplary user interfaces for making a private reservation of a publically offered reservable experience instance in accordance with some embodiments of the present disclosure.

Figure 1:
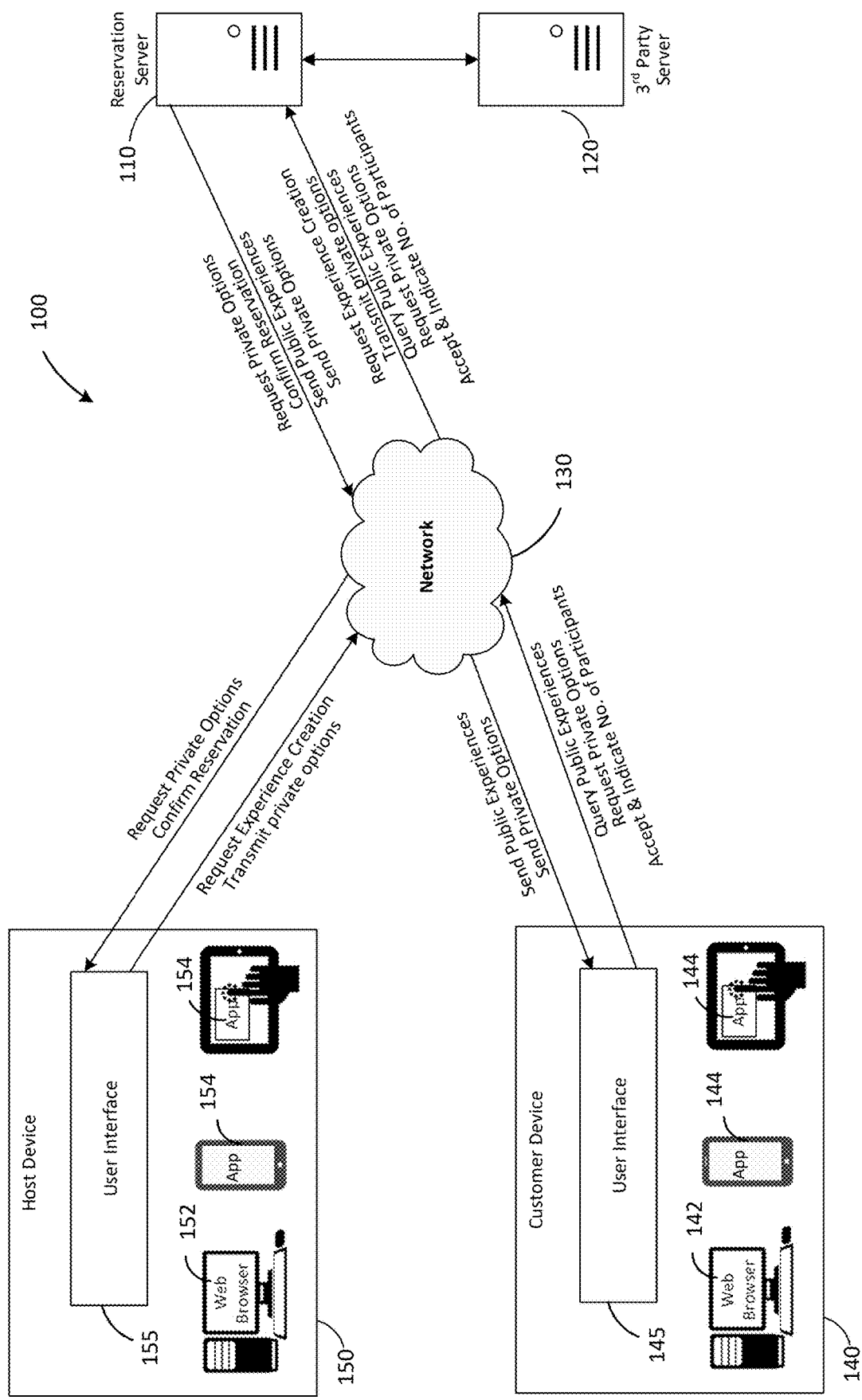
FIG. 1 is a diagram of an exemplary computing environment for requesting private reservations of publically-reservable experiences in accordance with some embodiments of the present disclosure.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

The solutions described herein generally pertain to computational systems and methods for allowing vendors, hosts, tour providers, and other entities (variously referred to herein as "hosts") to offer tickets/reservations to events, excursions, or activities (variously referred to herein as "experiences") to customers. A bookable "instance" of an experience may be associated with a particular date and time, such that an event that can be experienced at a first date/time is a separate instance than a second, otherwise identical event offered by the same host at a different date/time. An experience reservation system allows customers (also referred to herein as "guests" or "users" of the experience reservation system) to view a variety of experiences through a user interface such as an app or website, where an experience is offered to the public for booking on a per person/per guest basis. In an exemplary embodiment, a customer booking an experience may want to reserve the experience for a private event (e.g., birthday parties, family reunions, church group, scouting group, school group, social group, etc.) for a number of guests rather than purchase a set number of tickets and allow other guests to purchase one or more of the remaining tickets for that experience. The present disclosure provides a reservation system for public and private travel experience bookings that allows publicly available experiences to be easily booked privately according to a variable pricing model.

In one embodiment, an experience reservation system transmits, to a host-facing computing device, a user interface capable of taking in information from the host and transmitting that information to the experience reservation system. In some embodiments, the user interface includes a form (or a set of data entry fields) through which the host inputs or verifies information describing an experience that the host is offering for booking. The experience reservation system may take in from the host and store a set of pricing information for offering the experience to a user for public booking. For instance, public booking of the experience may be done with a set price per guest (per ticket), whether the guest is an individual person, party, group, or other unit entity, or any combination thereof. In some embodiments, all information regarding an experience is input by the host at the time of creation of a listing for the experience, and in other embodiments, any of various information can be collected at different times after creation of the listing for the experience. In some embodiments, each particular date and time at which an experience is available for reservation is referred to herein as an "instance" (i.e., a bookable instance) of an experience. In some embodiments, multiple instances may be associated with the same particular date and time (as just one example, multiple showings of a movie with the same start time), so long as the instances are uniquely identifiable such that a reservation could be made in a respective instance (whether or not the particular instance is known to the guest at the time of the booking).

In some embodiments, hosts may set private pricing information for reserving a public instance of an experience; that is, where a guest can reserve the entirety of an otherwise publicly-reservable experience (hereafter, public experience) as a private experience (by paying a particular set private price, e.g., a minimum price and a per person increase after a particular threshold) such that no other "public" user not in the guest's party can additionally book a ticket to the same instance, thereby altering or transitioning the instance of the experience from a public booking state to a private booking state. In some embodiments, the private pricing information allows guests to automatically book any public instance of an experience as a private instance of that experience as long as any required conditions are met (e.g., no other bookings for that instance have been made and private instances are enabled for the particular experience instance). Different circumstances of the booking, for instance a number/type of guests or a particular date/time, may necessitate the application of one of various different pricing models or pricing rules associated with the instance.

In some embodiments, potential or bookable experiences may be presented to the guest via a user interface displaying a set (e.g., a list) of public experiences or of instances of experiences available based on locality, genre, date/time, capacity, or other filtering factors. A guest may select, via the user interface, an experience or an instance of the experience and thereby view a detailed interface showing additional information and options for booking specific to the selected instance. Additional options and information may also be displayed for private bookings for the subject instance or experience. Such additional information and options may be available on the listing interface or may be made available on another interface (e.g., a detail interface). Such options may be made available by a click/press of a button or hyperlink, by hovering over text or a special indicator, or any know means of interacting with a user interface. Such additional information may include pricing information or pricing rules (e.g., a minimum price and per guest pricing) to allow a customer to determine how much it would cost to change the public experience or instance to a private booking.

In some embodiments, the customer's input (into a user interface) of a number of guests to attend the experience and acceptance of pricing details to make the public instance private causes the system to automatically create a reservation for a private instance of the experience. Further, if the particular instance has no other bookings, the system removes the instance from any public lists, advertisements, or displays (such that it would not be displayed to another user for booking) and/or flags the instance as unavailable for further booking (per person or group). In other embodiments, the private instance reservation request is sent to the host for approval. These requests may be sent in the form of a message or notification.

In an embodiment where other bookings exist for the instance, the customer may not be given the option to make the public instance private and/or the system may flag the instance as unavailable for any booking that is not made on a per person basis. In an alternate embodiment, the request for the private booking may be made by the guest but may be flagged by the system as conditional. The host may then be provided with an option to alter the instance or previous bookings thereof by, e.g., adding an additional instance or offering a rescheduling or compensation to the preexisting bookings to accommodate the private booking.

In embodiments where the host has not specified private reservation details and/or pricing information, options may still be presented to the guest allowing them to request a public instance be made private. The system may present to the guest, via a user interface, an option to to make an offer for private booking through the reservation server. This offer is sent by the reservation system to a host device, where the host is able, via a user interface, to accept, reject, or make a counter offer (e.g., changing pricing, date, timing, guests, or other conditions). In some embodiments, guests can request private instances of experiences for times and periods not previously created, disclosed, or made available by the host. Alternatively, the guest may use the system to generate a notification of interest in a private booking without making a specific offer. The reservation server may in response send an indication of the guest's interest to the host.

If a guest's offer for private booking is acceptable, the host can enter information and respond with private instance details. In some embodiments, the system transmits to the host, via a user interface, along with the indication of the guest's interest in making a private booking, a form (or a series of data entry fields) with an opt-in selection of a minimum value for a customer to book a private instance. Different minimum prices may be applied for different types of users (e.g., a child or adult, a group from a particular organization or affiliation, etc.). In an exemplary embodiment, the minimum value for a customer to book a private instance is a flat dollar value (or any appropriate currency) associated with a set number of guests. The customer may later alter the reservation of the private instance to add additional guests. The pricing for the private instance may remain flat at the minimum price, until a circumstance where if the instance had remained a public instance, the pricing for the total number of guests would exceed the minimum value. In that circumstance, when the customer attempts to add guests, the system may present the customer with a new set of pricing information, the price for private reservation of the instance having increased in accordance with the number of guests added (or by another measurement or partition of the number of guests added). In some embodiments, rather than presenting modified pricing information, the system may instruct or facilitate renegotiation of private instance details (e.g., pricing) between the customer and the host.

In some embodiments, the increase may be a linear increase, that is, a per guest cost. In another embodiments, the pricing may increase on a per guest basis, but the applied per guest cost may decrease as the number of total guests on the reservation increases. In other embodiments, the increase may not be linear on a per guest basis, and may instead be a stepped increase for each of a group or set quantity of guests. In some embodiments, pricing may differ depending on a guest type, where different prices may be applied to different individuals or groups (even within the same private instance) depending on the type of guests (e.g., adult/child/student/senior, discounted/undiscounted, membership/affiliation, human/pet, or any appropriate distinction for the particular event).

When a customer's request for private booking of the instance is accepted either automatically by the reservation server or by a host's manual acceptance (through a user interface) the guest may be presented with a user interface with details about the private instance. In some embodiments, this user interface may be accessible through links made available in a customer-facing user interface or other type of messaging or communication. A link provides the customer who placed the reservation with a user interface with special access to instance-specific and user-specific information about the private booking.

Conventionally, arranging private experiences requires a customer to contact an event host to make special arrangements. Some event hosts incur additional expense to take such calls and emails and to make such special arrangements. In conventional solutions, situations may exist where the host is not fairly compensated for their time or may lose money due to an underbooked event. Further, regardless of whether a private booking contains only a few or many guests, the fixed price for the conventional private booking may not make up for the host's loss of revenue compared to what the host would have expected to make on a public per person return. Conventional solutions are therefore dependent on the host's ability to predict in advance the expected attendance, a solution that may be unreliable and may lead to scenarios where the host is unfairly undercompensated, or, where the host may set a high set booking price to avoid such undercompensation, leading to a scenario where the customer pays an unfairly high price.

The systems and methods described herein improve computer-based reservation systems by applying defined, flexible pricing models that allow customers to make, via a user interface for an e-commerce service, private bookings and/or edit or add to their reservations without real-time input or approval from a host. The systems and methods described herein allow customers to change the state of an instance of a travel experience that was publicly offered for booking to a private booking or reservation. Rather than a set book out price, the systems herein apply, in a pricing model, a minimum booking price (or minimum reservation price or cost) for a privately-booked experience, wherein the pricing flexibly changes in accordance with the number of guests in attendance. Therefore, if more guests attend than were anticipated at booking, such that the per person price would have been higher than the minimum price, the private booking of the instance may be maintained while the cost of the private booking may increase. By these means, greater flexibility of booking and associated pricing is provided as compared to conventional e-commerce solutions which may require host-interaction for each and every change in price and/or availability. Further, because this is done in an automated fashion through a web server interface, a host is guaranteed to be compensated for the actual number of guests and to obtain their minimum intended profit, without having to engage in manual pricing negotiation. Further, an electronic reservation system can be modified to provide a better user experience, as the systems and methods described herein avoid situations where a previously-booked instance is cancelled by the host for lack of interest, or where the user making a booking cannot bring a desired numbered of guests to an event, thereby increasing the reliability of the content presented and made available on the reservation system.

FIG. 1 illustrates an exemplary embodiment of a reservation system 100. A reservation server 110 is connected to a communication network 130. Additionally connected to network 130 are one or more host devices 150 and one or more customer devices 140. In one exemplary embodiment, reservation server 110 is managed or facilitated (and in some embodiments, owned) by a travel-directed service provider. The travel-directed service provider may be generally understood as an individual or organization interested in delivering information, advertisements, or other communication for one or more travel-dependent products, experiences, events, and the like (herein to herein as experiences) to a user or potential customer in response to a query sent from a customer device 140. In some embodiments, the service provider may be a merchant or entity that uses or runs an e-commerce website or app, through which customers may buy, sell, rent, lease, and/or otherwise purchase or subscribe to the provider's products or services. In one example, the service provider managing reservation server 110 may provide an online reservation system that displays listings of properties in respective geographic locations, such as houses, condominiums, rooms, apartments, lots, and other real estate, that have been offered for reservation for a specified time period (e.g., a day, week, month, or other period of interest), and, in correlation with the display of that information, may also display listings of travel experiences that are neighboring to the geographic location, though of course the reservation server 110 and/or the service provider are not so limited in other embodiments.

Network 130 may comprise one or more network types, such as a wide area network (such as the Internet), a local area network (such as an intranet), a cellular network or another type of wireless network, such as Wi-Fi, Bluetooth, Bluetooth Low Energy, and/or other close-range wireless communications, a wired network, such as fiber optics and Ethernet, or any other such network, or any combination thereof. In some embodiments, the network 130 may be the Internet and information may be communicated between system components in an encrypted format such by a transport layer security (TLS) or secure socket layer (SSL) protocol. In addition, when the network 130 is the Internet, the components of the environment 100 may use the transmission control protocol/Internet protocol (TCP/IP) for communication.

A host device 150 communicates with a reservation server 110 via network 130. Host device 150 may be used by individuals or entities (referred to herein as "hosts" or users of the host device) who offer travel experiences to be booked by guests. Host device 150 is used to access, view, and/or take action in response to content delivered to the host from the reservation server 110 (in some embodiments, through an intermediate web server). A host device 150 may be implemented by one or more computing devices, such as a smartphone or other hand-held device (e.g., a tablet or reader), desktop computer, laptop computer, touchscreen device, or any other appropriate device capable of receiving, processing, and outputting digital information via network 130. In an exemplary embodiment, the host device 150 presents information to a host via a display on or connected to the device 150, and takes input from the host in relation thereto (for example, through interactive graphics, data input fields, or hyperlinks) via a touchscreen, mouse, keyboard, stylus, or any other appropriate input device.

In the illustrated embodiment, each host device 150 may have installed a web browser 152 and/or other appropriate applications 154 that can be used to communicate (receive and transmit data) with the reservation server 110 via the network 130. In some embodiments, app 154 may be a mobile application or other software application distinct from a generic web browser, such as an e-mail, messaging, or social media application, an application specific to the e-commerce business, or another program capable of receiving digital content from the reservation server 110 and delivering such content to the host device 150. In some embodiments, the host device 150 may present to its user a host-facing user interface 155 (e.g., a graphical user interface, through app 154 or web browser 152) allowing for the inputting and/or transmitting of information that may be necessary to or helpful in the creation of a listing describing a travel experience and making that experience available for booking. Such information may include any of text, pictures, location information, pricing information, availability information (e.g., time and dates), contact information, and/or any other information that may be relevant to a user to make a public booking of the experience. While the term "travel experience" is used herein, there is no limitation on what an experience is, where it is located, or whether a guest much travel to attend the experience. Rather, an experience may simply be understood by an event or activity that may be attended or experienced by a number of guests.

A customer device 140 communicates with a reservation server 110 via network 130. Customer device 140 may be used by individuals or entities (referred to herein as "users," "guests," or "customers") who may book an experience to be attended by one or more guests. Customer device 140 may be used to access, view, and/or take action in response to content delivered to the user from the reservation server 110. A customer device 140 may be implemented by one or more computing devices, such as a smartphone or other hand-held device (e.g., a tablet or reader), desktop computer, laptop computer, touchscreen device, or any other appropriate device capable of receiving, processing, and outputting digital information via network 130. In an exemplary embodiment, the customer device 140 presents information to a user via a display on or connected to the device 140, and takes input from the user in relation thereto (for example, through interactive graphics, data input fields, or hyperlinks) via a touchscreen, mouse, keyboard, stylus, or any other appropriate input device.

In the illustrated embodiment, each customer device 140 may have installed a web browser 142 and/or other appropriate applications 144 that can be used to communicate (receive and transmit data) with the reservation server 110 via the network 130 (in some embodiments, through an intermediate web server). Such components may be generally understood to function in a manner along the lines of the analogous components in host device 150. In some embodiments, the customer device 140 may present to its user a customer-facing user interface 145 (e.g., a graphical user interface, through app 144 or web browser 142) configured to display information from reservation server 110. Through the customer-facing user-interface 145, a customer using a customer device 140 may request or otherwise be presented with a set of experiences available for reservation, the set of experiences being presented as a list, thumbnails, textual or graphical representations, or in any other appropriate form or layout. After reviewing the available experiences, the customer may request private options for a particular experience or for a private instance of a particular experience. In some embodiments, a customer, in addition to booking experiences as a customer, may offer their own experiences as a host, and therefore, a single device may operate both as a customer device 140 for a first series of transactions and as a host device 150 for a different series of transactions.

While one type of device or another is illustrated for the host devices 150 and customer devices 140, such is not meant to be limiting. Further, while FIG. 1 illustrates only one customer device 140, one host device 150, one reservation server 110, and one third party server 120, it may be understood that any number of devices and/or any number of servers may be variously configured in different embodiments.

Figure 2:
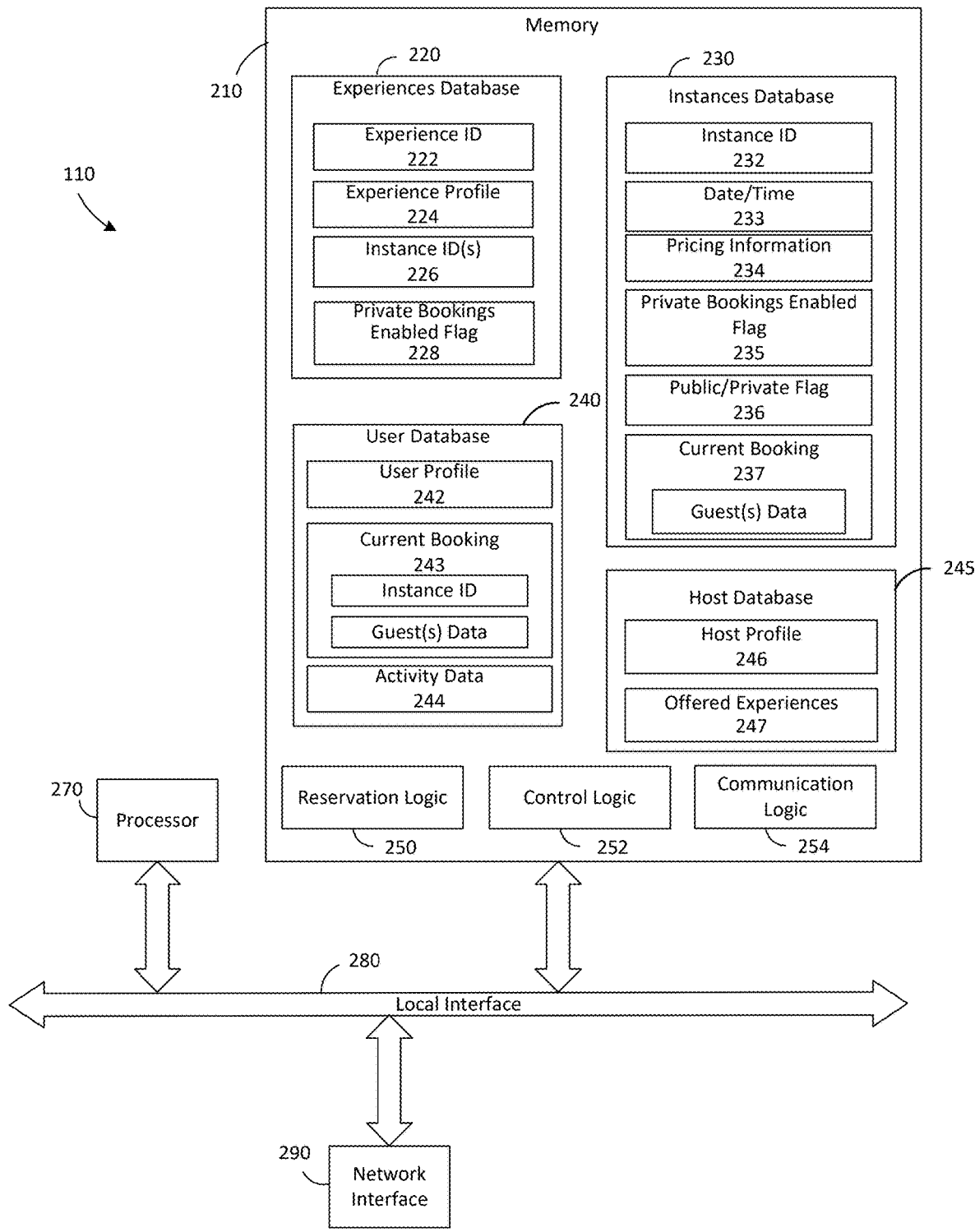
FIG. 2 is a block diagram illustrating select component parts of an exemplary reservation server in accordance with some embodiments of the present disclosure.

FIG. 2 depicts an example schematic diagram of certain components of reservation server 110 in accordance with some embodiments of the present disclosure. The reservation server 110 may include a memory 210. As used herein, memory 210 may refer to any suitable storage medium, either volatile and non-volatile (e.g., RAM, ROM, EPROM, EEPROM, SRAM, flash memory, disks or optical storage, magnetic storage, or any other tangible or non-transitory medium), that stores information that is accessible by a processor. Memory 210 may store instructions used in the systems and methods described herein. While FIG. 2 illustrates a single discrete memory 210, it will be understood that the embodiments described herein are not limited to any particular arrangement and that other embodiments may store information in one combined memory, or with information stored in a different configuration in one or more memories, some local to the other components illustrated in FIG. 2 and/or some shared with, or geographically located near, other computing systems.

The reservation server 110 includes one or more processors 270 for executing instructions stored in memory 210. Exemplary processor 270 may include one or more of: a central processing unit (CPU), digital signal processor, other specialized processor or combination of processors, or other circuitry that communicates to and drives the other elements within the reservation server 110. The illustrated embodiment depicts a number of modules stored in memory 210, including reservation logic 250, control logic 252, and communication logic 254. These depicted modules may variously represent one or more algorithms, computational models, decision making rules or instructions, or the like implemented as software code or computer-executable instructions (i.e., routines, programs, objects, components, data structures, etc.) that, when executed by one or more processors 270, program the processor(s) to perform the particular functions of their respective logic. These modules are depicted in FIG. 2 as several discrete components, each labelled as an individual "logic", however, in various embodiments, the functions of each respective logic may be executable on their own or as part of one or more other modules; that is, any configuration of the depicted logical components may be used. While, in the exemplary embodiment, each of reservation logic 250, control logic 252, and communication logic 254 is depicted as part of server 110, these logical components need not be so configured, and in other embodiments, other configurations of the various components, within server 110 or distributed over one or more computing systems, are possible. Reservation logic 250, control logic 252, and communication logic 254 (or components thereof) may be variously implemented in software, hardware, firmware or any combination thereof. In the exemplary embodiment of FIG. 2, reservation logic 250, control logic 252, and communication logic 254 are implemented in software and are stored in memory 210. Note that these components, when implemented in software, can be stored and transported on any non-transitory computer-readable medium for use by or in connection with an apparatus (e.g., a microprocessor) that can execute instructions. In the context of this disclosure, a "computer-readable medium" can be any device or system that can contain or store a computer program for use by or in connection with an instruction execution apparatus. The capabilities of these various logics are described in greater detail below.

While FIG. 2 illustrates one processor 270 that implements all of the various logics in the reservation server 110, it is possible in other embodiments for the server 110 to employ multiple processors. In one such alternate embodiment, discrete processing elements may be used for each of (or any subset of) reservation logic 250, control logic 252, and communication logic 254, or any portions or subsets of those logics. In some embodiments, the processing of server 110 is not limited to being performed by a local processing element (that is, connected to a local interface 280), but instead, any portion of processing in support of the various logics may be distributed over one or more computer systems that may be remotely located. In some embodiments, the processor 270 may comprise an artificial neural network or other type of configuration for performing machine learning functions based on instructions stored in memory 210, where reservation logic 250 may be implemented at least in part as one or more machine learning algorithms.

The reservation server 110 may include control logic 252, including one or more algorithms or models for generally controlling the operation of the reservation server 110. The memory 210 may also, in one embodiment, include communication logic 254, including one or more algorithms or models for obtaining information from or communicating information to one or more of the customer devices 140, host devices 150, or remote third party systems 120 via network 130 (FIG. 1). Further, the reservation server 110 may have a local communication interface 280, which may include at least one communication bus, to exchange data with various components and/or devices of the server 110. The server 110, via network interface 290, operates to exchange data with various components and/or devices on the network 130 or any other network(s). For instance, network interface 290 and communication logic 254 may be used (by, e.g., reservation logic 250 to perform the functions described in greater detail herein), to access data from a host device 150, a customer device 140, a third party system 120, or one or more web servers or other systems. In some embodiments, communication logic 254 may use APIs provided by a web server (not specifically shown) to obtain stored data, however, other methods of data collection may alternatively be used such as one or more software development kits, which may include, e.g., application programming interfaces (APIs), web APIs, tools to communicate with embedded systems, or any other appropriate implementation.

Communication interface 290 and communication logic 254 may be used (by, e.g., reservation logic 250, in the manner(s) described in greater detail below) to communicate over network 130, for example to present or intake data via customer-facing user interface(s) 145 and/or host-facing user interfaces 155. While communication logic 254 is illustrated as being a separate logical component, in an alternative embodiment, the reservation server 110 may include communication logic 254 as part of reservation logic 250 or control logic 252. In another alternative embodiment, the communication logic 54 may communicate with third-party systems and/or may coordinate with the control logic 252 to read or write data to memory 210 or to another data repository (not specifically shown) within the reservation server 110.

Memory 210 may be configured, in some embodiments, to include a user database 240 that stores information and metrics related to one or more users (also referred to herein as "customers") in relation to their profile and/or activity within the reservation system 110 and a host database 245 that stores information and metrics related to one or more hosts in relation to their profile and/or activity within the reservation system 110.

The data stored in user database 240 may include information from a user's profile 242, such as, e.g., user ID or another identifier that may uniquely identify the user, user account information (e.g., name, contact information (e.g., email address, mailing address, telephone number, date of birth, payment card information), demographic data about the user, such as age, gender, location, language, and device information, GPS or location data, operating system, browser, or other device data, user preferences, connected third party accounts (e.g., social networks) if applicable, and the like. User database 240 may also include information about a user's current experience bookings (or other purchases or related bookings) 243, whether pending (in progress) or upcoming bookings, including an instance ID (corresponding to an instance in instances database 230, described below) and guest(s) data for that booking, and/or any other appropriate type of information specific to or related to the user. In some embodiments, user database 240 may also contain activity data 244 about a user's onsite activity with one or more e-commerce websites managed by the service provider of the reservation server 110, such as clicks, searches, views, messages sent/received, favoriting/saving, past bookings, or the like (whether historical or associated with a particular session or device). Such data is not limited to the user's express activity on a website or app but may include any interaction, such as engagement with or use of an application or social media associated with the service provider of the reservation server 110.

The data stored in host database 245 may include information from a host's profile 246, such as, e.g., host ID or another identifier that may uniquely identify the host, host account information (e.g., name, contact information (e.g., email address, mailing address, telephone number, date of birth, payment card information), demographic data about the user, such as age, gender, location, language, and device information, GPS or location data, operating system, browser, or other device data, user preferences, connected third party accounts (e.g., social networks) if applicable, and the like. Host database 245 may also include information about a host's offered experiences 247, whether currently offered, offered for future bookings, or offered in the past (no longer available booking) or past bookings, including an experience ID (corresponding to an experience ID 222 in experiences database 220, described below), and/or any other appropriate type of information specific to or related to the host.

Reservation logic 250 allows the reservation server 110 to perform many functions including facilitating the display of experiences and experience instances to hosts and guests and the intake of information related thereto, facilitating communications between hosts and guests, the tracking, management, and facilitation of experience instance reservations, and the collection of guest fees and/or host fees. Experiences database 220 stores information and metrics related to individual experiences. Each unique experience in experiences database 220 may be identified by an experience ID or other identifier 222. This experience ID 222 may be used in association with one or more of an experience profile 224 that describes the experience being offered by its respective host, information 226 about available instances of the experience, whether past or future, including an instance ID (corresponding to an instance in instance database 230, described below), and/or one or more flags 228 indicating whether the experience is available to users for private booking. The experiences database 220 may be generally understood to contain information regarding one or more travel experiences that may be available to the users of the reservation server 110. In some embodiments, experiences database 220 may also contain information regarding travel experiences that were created by hosts but are not (or are not yet) available for viewing or booking by the users of the reservation server 110, though in some embodiments, there may be no such experiences.

Memory 210 may also be configured to include an instances database 230 that stores information and metrics related to individual instances (typically associated with unique date/times) of travel experiences that may be available to the users of the reservation server 110. It can be generally understood that an experience in database 220 may be associated with one or many unique instances in instances database 230. Each unique instance in instances database 232 may be identified by an instance ID or other identifier 232. This instance ID 232 may be used in association with one or more of date/time information 233 regarding when the experience is offered, pricing information (e.g., instance-specific pricing rules) 234, one or more flags 235 indicating whether private bookings are enabled for the instance, one or more flags 236 indicating whether the instance is currently made available as a public or private instance, and current booking information 237 regarding any current bookings of the instance. Current booking information 237 may include information identifying one or more unique reservations of the instance and guest(s) information for each (identifying at least a number of guests and/or their respective guest types), where a plurality of reservations would exist if the instance were public and had been separately booked by multiple guests.

The various described logics stored in memory 210 may read data from or write data to the user database 240, the host database 245, the experiences database 220, and/or the instances database 230 as part of their respective functionalities. It will be noted that while the term "database" or "repository" is used with reference to systems 210, 220, 230, and 240 and/or the data structure(s) therein, these components are not so limited nor is any particular form or configuration of data storage mandated, and the described "databases" may alternatively be an indexed table, a keyed mapping, or any other appropriate data structure. In an exemplary embodiment, memory 210, user database 240, host database 245, experiences database 220, instances database 230, and server 110 as a whole are managed by the service provider so as to be connected to a local network, however, other configurations may be possible in other embodiments, as long as server 110 is able to access data from the databases.

The reservation logic 250 may arrange to provide one or more interfaces through web browsers, applications, or through API functions for one or more interfaces. One or more interfaces may facilitate creating, editing, and deleting of experiences and instances of those experiences by hosts. One or more interfaces may also facilitate the searching, listing, browsing, selecting, and booking or reserving of experiences and instances by guests.

Figures 3A, 3B:
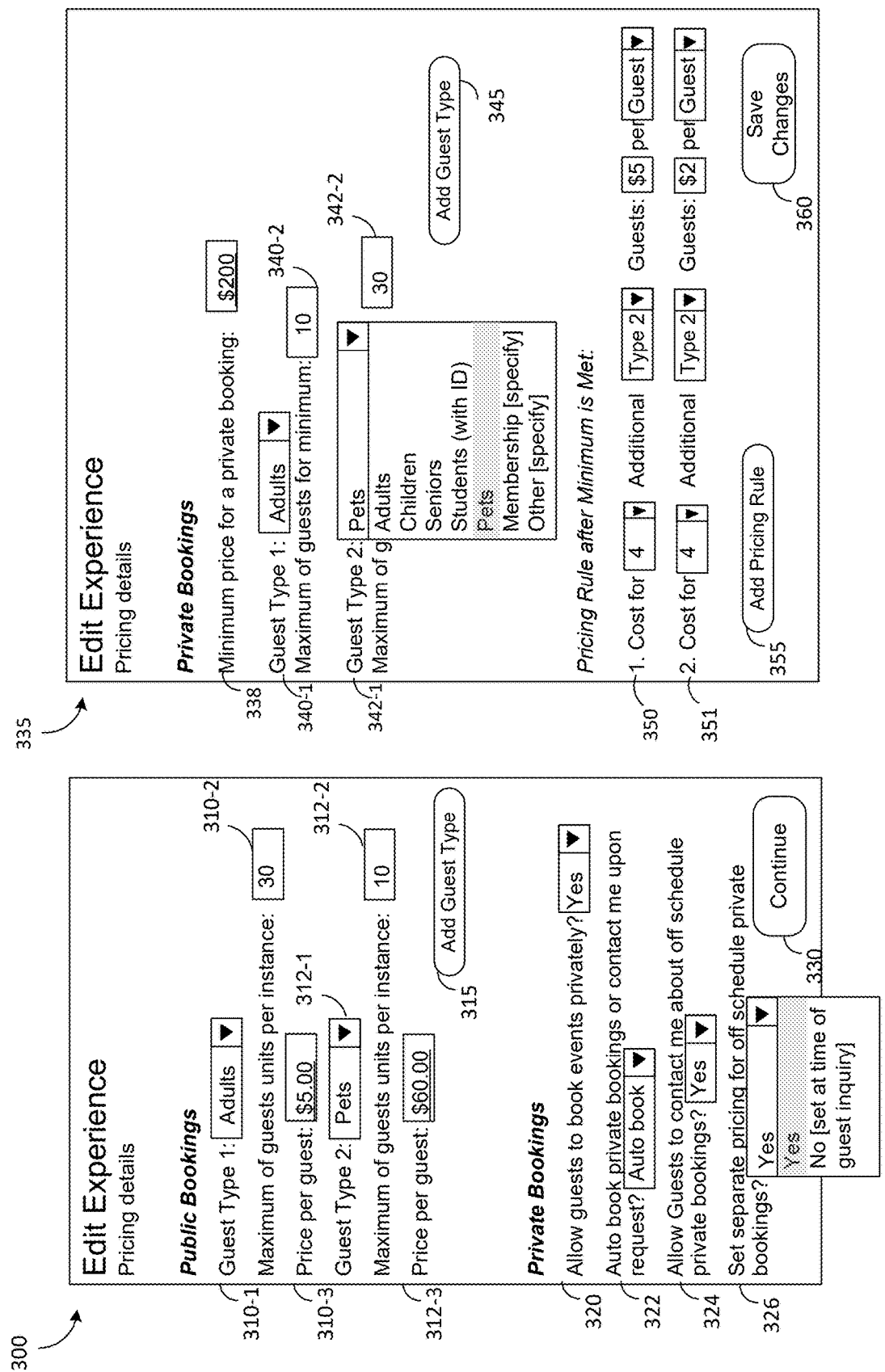

In an exemplary embodiment, reservation logic 250 may provide, to host-facing user interface 155, one or more interfaces, screens, or forms through which a host using a host device 150 can transmit to reservation server 110 a request to create a new experience listing and/or edit an existing experience listing. FIGS. 3A, 3B, and 3C illustrate graphical user interfaces (GUIs) for allowing a host to edit an existing experience listing and to set relevant pricing structures for that experience. FIGS. 3A through 3C present information that might appear on the display screen of host device 150 when using the host-facing user interface 155. GUI 300 of FIG. 3A includes a number of user interface components that take in information from the host. While the GUI 300 (as well as the other user interfaces depicted in FIGS. 3A-5D herein) variously contains buttons, input fields, check boxes, radio buttons, and/or drop down selection boxes, other embodiments may use any graphical or non-graphical (e.g., text-based) representation. It will be generally understood that the various user interfaces depicted herein are merely exemplary, and other embodiments are not so limited and may use any appropriate configuration for data collection.

The exemplary GUI 300 shown in FIG. 3A is presented to the host after instantiation of an experience. For instance, the host may have been presented with a one or more user interfaces on the display screen of host device 150 that facilitate the input of information regarding the offered experience, e.g., through a form with data entry points. This information includes, for instance, the name of the experience, one or more experience locations, contact information for the experience, a general description of the experience, a category for the experience (e.g., sports, entertainment, sightseeing, etc.), and the like. In some embodiments, upon an initialization of a request to create an experience (not specifically shown), the reservation logic 250 generates a unique experience ID in experiences database 220. As the host enters information about the experience (or submits such information via a user interface), such data may be processed and/or formatted and stored in experiences database as experience profile 224, in association with the experience ID 222. In some embodiments, the host is logged into a secured web page prior to the creation of such a page. In some embodiments, some or all of the information regarding the experience (such as, e.g., the location and/or contact information for the experience) may be based on information collected from or derived from the host's profile stored in host database 245.

GUI 300 in FIG. 3A presents a screen that allows the host to enter pricing information for the experience. As can be seen, the pricing information is separated into two fields: a section for public bookings and a section for private bookings. In other embodiments, such labels may not be shown, and only fields 310-315 (related to public booking) may be displayed to the host unless and until the host elects to enable private bookings. In the illustrated embodiment, GUI 300 includes the option to set different pricing structures for different types of guests (different guest types), with fields allowing the input of a maximum number of guests 310-2, 312-2 and a price per guest 310-3, 312-3 defined for each of a guest type 310-1 and 312-2, respectively. A guest type may include, for instance, adults, children, seniors, students, pets, members of particular organizations, or any appropriate categorization, either predefined and stored in the memory 210 or specified by the host at the time of experience creation or editing. The number and range of guest types may vary depending on the nature of the experience, for example, the host may wish to charge different prices for adults/children, give discounts to members of a particular organization or affiliation, etc. In the particular example of FIG. 3A, the host may provide a pet photography experience, and may define a first guest type 310-1 of Adults, priced at $5 per individual, and a second guest type 312-2 of Pets, priced at $60 per pet. Of course, other embodiments are not so limited and any number and type/pricing of guests may be used. In some embodiments, the remaining input prompts (described in further detail below) are altered, updated, and/or added in view of the selected guest type, and/or the configuration of the GUI 300 may be altered to accommodate such changes.

At field 320, the GUI 300 allows a host to define whether to allow private instances. This option may set a flag 228 in experiences database 220 in association with the experience ID 222 for the experience being created. In some embodiments, the options for field 320 are a binary value (yes/no), and in other embodiments, a host may be able to defer this decision, so as to not actively provide an option to a guest for private booking but to wait to see if any guests indicate interest in such a feature. For instance, in one embodiment, field 320 may provide an option that private bookings are "allowable upon consideration," which may cause the registration logic 250, upon initiation of interest by a guest (described further herein), to send a message or notification to the host potentially including greater details of the group input from the guest making the reservation requesting the host to approve the registration of additional guests. Field 322 is an input for whether, upon selection of a private booking option by a guest, the server 110 automatically reserves an instance of an experience (described in greater detail later) or sends a notification of the request to book to the host via, e.g., a message via host-facing user interface 155, a text message/SMS, a voicemail, an email, or any other communication, thereby placing the guest's booking in "hold" or pending status until the request is approved or denied (or otherwise further acted upon). Field 324 provides a binary selection of whether or not to allow guests to contact the host to schedule off-schedule private bookings, that is, a request to book an experience outside of the date/times associated with the available instances of the experience (the creation of different instances described in greater detail below with reference to FIG. 3C). FIG. 3A further illustrates an option in field 326 for the host to set separate pricing for such off scheduling bookings.

Upon entry of the information on GUI 300, the host may select the continue button 330. In one embodiment, where the host has selected not to allow guests to book events privately (field 320) and has selected not to allow guests to contact them about private bookings (field 324), the process may continue to a confirmation page or further steps in finalizing the edits to the experience (not shown). In an embodiment where the host has allowed private bookings and/or has allowed users to contact the host regarding private bookings, the selection of continue button 330 may take the host to GUI 335 illustrated in FIG. 3B, which allows the host to set and/or edit pricing rules and details for private bookings of the experience.

In some embodiments, public and private instances of an experience use the same pricing rules. With reference to FIG. 3B, GUI 335 presents a field 338 for the host to enter a minimum price for a private booking, that minimum price being associated with a certain number of guests. This minimum price represents a value that must be paid to reserve the experience regardless of the number of guests in attendance. In the exemplary embodiment, this minimum price is set to a value at or above the minimum expectation of return the host would have had, had the event been open to public booking, however, any appropriate price may be set in various embodiments. In the embodiment of FIG. 3B, different maximum numbers 340-2, 342-2 of different respective guest types 340-1, 342-1 can be selected, and additional guest types (and associated maximum threshold values) can be added via field 345. Until at least one of the maximum threshold number of guests of a particular guest type is satisfied (that is, one or more bookings have been made or have been requested sufficient to meet that number/type of guests), the cost to the customer for maintaining the private experience booking remains at the minimum value. The fields in GUI 335 are merely exemplary and in some embodiments, the host may be given options to indicate to the customer whether the pricing or attendance limits are flexible and/or open to accommodation.

Field 350 allows for the entry of additional pricing rules that may append further fees or charges if the customer wishes to add guests to the private event beyond the maximum threshold guest numbers set in fields 340-2, 342-2. As illustrated in FIG. 3B, the host has entered as Rule 1, that a cost for up to 4 additional guests of Type 2 (here, Pets) may be added at a cost of $5 per guest. The host may add additional pricing rules through button 355, which may alter the GUI 335 to add one or more additional fields 350 for entry of new after-minimum pricing rules.

In some embodiments, the GUI 335 may contain input fields sufficient to indicate how the multiple pricing rules 350 are applied to a proposed private booking given different combinations of guests that may be potentially requested by a customer. In some embodiments, the application of rules may default to a certain pattern or sequence, or may be dependent on a predetermined rule priority (set by the host or by the reservation logic 250). The multiple pricing rules 350 may be sequentially applied, for instance, a first rule may be applied for the first four additional guests, and the second rule may be applied of the second four (or selected number) additional guests beyond the first four. That is, all of the rules may in some circumstances be applied to a booking at one time. For example, beyond pricing rule 350 applying to a first four addition guests, GUI 335 shows an added pricing rule 351, in which a next four additional guests of Type 2 (beyond the first four) are priced at $2 per guest, a price lower than the per guest price for the first four additional guests according to pricing rule 350. Accordingly, the increase or change in per guest cost need not be linear or regular across pricing rules.

In some embodiments, the rules may be disparately applied (where, e.g., application of multiple rules would conflict with each other) such that only one or a subset of rules may be applied to a booking at one time. For instance, if one to five guests are being added beyond the maximum threshold values 340-2, 342-2, the cost may be a first value per guest, but if six to ten guests are being added, the cost may be different. This may allow the host to offer a lower cost per guest to provide a discount for a larger group, or alternately, a higher cost per guest to discourage large additions.

In still other embodiments, the additional pricing structures may not be a per guest cost, but may instead be stepped (per each group of x number of guests), may be defined with a flat value for any additional guests (e.g., a flat fee to cover additional staffing or location costs), or may follow any appropriate pattern. It can be generally understood that GUI 335 may be configured to provide a flexible point of input 350 for the host to define pricing structures that extend beyond and differ from the minimum booking value. Upon entry of the information on GUI 335, the host may select the save changes button 360. In one embodiment, the process may then continue to a confirmation page or further steps in finalizing the edits to the experience (not shown).

In some embodiments, instead of using the maximum numbers set in fields 340-2, 342-2, if the customer wishes to add guests to the private event, the reservation logic may calculate a public booking value for the total number of guests for the private event after the proposed addition. This public booking value corresponds to a hypothetical price that a customer would pay if they were reserving seats or tickets for the listing as a public booking rather than a private booking, that is, applying the costs set out in fields 310-312 of FIG. 3A. If the public booking value exceeds the minimum price for a private booking 338, the reservation logic may then apply any defined additional pricing rules 350.

In the exemplary embodiment, the fields in GUI 335 setting the pricing values and the number of guests are open to the host, that is, any value greater than or equal to zero may be set. In other embodiments, the reservation server 110 may provide a set of predetermined values, and/or may apply one or more predefined limitations on the numbers that may be set. For instance, restrictions may be applied to set maximum or minimum values, to apply taxes, service costs, or other applicable fees, to comply with applicable rules or ordinances (e.g., fire codes, zoning restrictions, regulatory limitations or the like) or regional or cultural conditions (e.g., altering the value to local currency), or to otherwise limit pricing or attendance values to reasonable and/or appropriate values.

In some embodiments, reservation server 110 may obtain information from one or more third party systems 120, including, e.g., public information repositories, third party websites or databases, social media resources, or the like, to obtain information about a location or venue (e.g., capacity limits, local regulations), pricing information, or other restrictions that may limit the attendance at an event. This third-party information obtained may be used, in some embodiments, by the reservation logic 250 to modify the values set by the host via GUIs 300, 335, 390 and/or to provide notification or information to the host to guide them in setting pricing rules for the experience.

In some embodiments, the reservation server 110 may be implemented in whole or in part as a machine learning system (e.g., neural network software) for achieving the functionalities described herein. In one embodiment, reservation logic 250 may be implemented at least in part as one or more machine learning algorithms, which may, for instance, suggest private pricing information to a host upon creation of a public instance of an experience or upon receipt of an indication of interest in a private booking from a customer, or may suggest pricing information to a customer when requesting a private instance of an experience that is not already available for private booking (viz., private booking pricing information has not previously been set by the host). In one embodiment, such pricing suggestions may be made based upon historical pricing and booking information for listings, for example based on a weighted analysis of information derived from any of one of more of: the host's other offered experiences, other private experiences sharing a geographic location as the instant experience, other private experiences sharing date/time characteristics as the instant experience, other private experiences sharing an experience type (e.g., sports, outdoors/nature, food/drink, leisure, entertainment, sightseeing, family, or any other appropriate category) with the instant experience, popular or average pricing information for private experiences, and/or other private experiences booked by the customer or by other customers sharing one or more user characteristics (e.g., guest type, demographic data, device information, GPS or location data, user preferences, connected third party accounts such as social networks, if applicable, and the like) with the instant customer.

FIG. 3C illustrates a GUI 390 that may be presented to the host in place of GUI 300 that allows the host to define different pricing rules for each of one or more instances of an experience, each instance being associated with a specific date/time or a range of dates/times. That is, while specific instances of an experience may be created or defined by the host via another user interface (not specifically shown) displayed on host-facing user interface 155, GUI 390 allows for the definition of which pricing rules apply at what date/times, and thereby, which pricing rules apply to what instances (corresponding to those dates/times). In some embodiments, prior to the display of GUI 390, the host may have already been presented, via host-facing user interface 155, with one or more screens with which the host can enter date/times or ranges of date/times conforming to different "instances" of the experience, each being bookable for up to a maximum of one or more of certain numbers of reserved seats or tickets, defining the number and types of guests that may attend the instance. Each unique bookable instance is assigned a unique instance ID by reservation logic 250, such ID being stored in database 220 as an instance ID 226 in association with the experience ID 222. In database 220, a single experience may correspond to zero, one, or a plurality of instance ID(s) 226.

Element 370 of GUI 390 is representative of information previously entered and saved by the host of the experience, defining a Pricing Rule 1 that applies to any instance falling within the date/time range of Monday-Friday, 9 am-5 pm, though any range(s) of time is possible in other embodiments. The exemplary Pricing Rule 1 defines a price per guest for each of the guest types listed. Each pricing rule (or information from which the pricing rule may be derived) is stored in instances database 230 as pricing information 234 associated with a unique instance ID 232. This pricing information is stored for each instance of the experience falling within the defined date/time range of the pricing rule. In some embodiments, a pricing rule is stored as one or more conditions and/or algorithms that may be applied by reservation logic 250 to a total price value for an instance, given at least one input number and/or type of guests. Additional pricing rules may be added by interacting with the button 375. Each pricing rule input by the host is stored in instance database 230, so that multiple rules are stored. In some embodiments, reservation logic 250 performs additional checks on the viability of pricing rules, for example checking for logical conflicts or redundancy in the stored pricing information before storing a newly defined pricing rule in pricing information 234.

When button 375 is pressed, GUI 390 may be modified to display the fields in New Pricing Rule section 380. Field 382 allows for the definition of one or more days and a range of time (or in some embodiment, multiple ranges of times), for which different pricing structures can be set for a customer. The remaining fields in GUI 390 may be understood to generally conform to fields 310-330 described herein with reference to FIG. 3A. The information entered via these fields may be stored by reservation logic 250 in association with an experience in database 220 and/or each of its associated instances in database 230. For example, at field 320 of FIG. 3C, the GUI 390 allows a host to define whether to allow private instances. A host input in this field may set a flag 235 for each instance in instances database 230 with a date/time value or range overlapping with the date/time of the pricing rule (here, Pricing Rule 2) that corresponds to the instance ID for the experience in experiences database 220. The selection of Continue button 330 may direct the host to the GUI 335 of FIG. 3B, defining private booking pricing for the specified Pricing Rule 2 or to another appropriate screen. In some embodiments, field 382 may additionally or alternately allow the selection or input of additional date/time restrictions or limiters by the host, for example specifying new pricing rules for holidays or other restrictions that may necessitate special pricing for a customer.

While not indicated in FIGS. 3A-3C, a host may, via one or more GUIs delivered to host-facing user interface 155, further edit or change experiences or instances to add or remove pricing rules, and to toggle or change the experiences between public and private, to add instances, to remove instances, or to make any other appropriate changes. In one embodiment, a host may cancel or edit an instance regardless of whether any public or private bookings have been made, and in other embodiments, if any bookings exist, the host may be unable to cancel or edit such instance. In some embodiments, the host may be able to edit instance(s) information (e.g., date/time, location etc.), pricing information, or other information at any time, and in other embodiments, if the experience is booked by one or more customers, the host may be prompted to notify the customers of such changes and/or receive approval prior to such changes being made to the instances database 230.

The reservation server 110 may additionally function to provide one more customer-facing user interfaces 145 to a customer, through which they can view experiences from database 220 that are available for public booking, select one or more such experiences, and make a private booking thereof for one or more guests, in accordance with the pricing rules defined by the host in the manner described above. In an exemplary embodiment, the experiences are displayed to the customer in response to a query, search, or user action, however, other embodiments may exist where a listing of available experiences is delivered to the user as part of a marketing communication, at a scheduled or periodic basis, and/or in response to or in accompaniment with another action taken by the user (e.g., a travel reservation made).

FIG. 4A depicts an example GUI 400 for displaying icons representing travel experience listings to a customer, in accordance with some embodiments of the present disclosure. GUI 400 represents information that might appear on a display screen of a customer device 140 when using customer-facing user interface 145. GUI 400 includes a header region 405 that specifies that the screen allows the user to "search for experiences." Header region 405 also includes a login indicator 410 containing hyperlink operations for login/sign up. In an exemplary embodiment, a customer must be logged in (e.g., based on or associated with user information stored in user database 240) in order to make any private bookings and/or to exchange information or messages with the host of an experience, however, other embodiments may exist where a customer may take one or more private booking actions without being logged in or having a profile with the providers of the app/website displayed in GUI 400, such as searching, or booking an experience for which the private booking enabled flag 235 is set.

GUI 400 may also include a search field 420 and one or more options for filtering search results, shown in filter region 425. Search field 420 may be used by the customer to input an address, geographic region, landmark, intersection, city, state, country, or any other geographic information that is relevant to an area in which the user wishes to search for experiences, or for categories of experiences (e.g., sports, entertainment, food/drink, outdoors, etc.), experience name, or other characteristics that may be relevant to identifying travel experiences. Filters 425 may be activated before or after the search is initiated, to further narrow search results and/or provide additional information. The bottom section of GUI 400 is a search results field 430 which displays a number of icons to the user conforming to experience "listings". Each of the icons represents a unique experience (associated with an experience ID 222 in the experiences database 220) that the customer can select and/or book or reserve, i.e., available instances of the experience exist. In an exemplary embodiment, the experience listings are shown as a grid of images, where each image can be clicked or otherwise interacted with in order to access additional information about the experience and/or make a booking. Other embodiments may exist where search results are presented as text, video, images, or any combination thereof, as a list, map, or other graphical or textual representation, and the like. In an exemplary embodiment, the results are presented to the user in a recognizable order or ranking however, any configuration may be used.

In an exemplary embodiment, reservation logic 250 may display to the customer the listings of all available experiences in database 220, corresponding to each unique experience ID 222. This information may be presented to the user via customer-facing user interface 145 of customer device 140. In some embodiments, reservation logic 250 may only compile and display a set of listings via the customer-facing user interface 145 in response to a query or search by a user specifying a geographic area, a date/time, a number of guests, a type of activity (e.g., sports, outdoors/nature, food/drink, leisure, entertainment, sightseeing, family, or any other appropriate category), or another action by the user indicating an interest in receiving travel experience recommendations, such as clicking a link, navigating to a particular page or interface in a browser or app, opening an application, interacting with an advertisement, email, message, social media post, or the like. In some embodiments, rather than in response to a query or action, the experience information may be generated and/or displayed to the user on an ad hoc or periodic basis (such as in a recurring communication).

In some embodiments, only a subset of experience listings may be displayed to the customer in response to the customer query or action. This subset may be, in one embodiment, a set of listings obtained by applying one or more filters to the experiences in database 220. These filters may, in one embodiment, be taken from the user-submitted query, for example, by filtering the available instances to a certain date or date range, a certain location (or a distance range from set location), to experiences capable to accommodating a certain specified number of guests or guest types, or the like. In some embodiments, rather than obtaining filter information from a user query, one or more filters may be applied based on information associated with the customer in user database 240. In some embodiments, current booking data 244 for the customer may be used to filter the set of available experience listings. For instance, the reservation logic 250 may access the guest data associated with any current bookings of the customer in user database 240, and may only display to the customer experiences with a capacity greater than or equal to the number of guests associated with the customer's current booking 244. In some embodiments, interest data, past boking data, activity data, or other relevant profile or historical information may be used to filter the set of experience listings displayed to the customer. In some embodiments, third-party data obtained from server 120 via network interface 290 may be used (e.g., social media data, car/hotel/travel booking data, and the like) to filter the set of experience listings displayed to the customer.

Upon selection of a listing associated with a travel experience, the customer may be directed to a default user interface for the experience, drawn from data stored in experiences database 220 associated with the experience ID 222 of the clicked-upon experience. In some embodiments, the clicked-upon experience ID may be temporarily stored or cached by server 110, in association with the customer's activity on the website or app. For instance, while the customer is browsing the website or app via customer-facing user interface 145, the customer's activities may be stored with a session ID or in association with the customer's profile, either temporarily or until the cache is cleared, or until a new experience is clicked upon.

The default interface for the experience may present to the customer one or more publicly-available instances of the experience that are available for booking, along with booking information for each, allowing the user to making a reservation or booking. In some embodiments, rather than booking information, the interface may contain one or more hyperlinks, pop-ups, or other interfaces through which another interface for booking is presented on the display of customer device 140. In some embodiments, the default interface may also display to the user one or more pieces of information stored in or in association with the experience profile 224, such as the location of the experience, a description of the experience, contact information for the experience (e.g., phone number or website), one or more photographs or images, user reviews or ratings, date/hours or other availability information, directions, and/or other appropriate information.

An exemplary embodiment of such an interface, GUI 440, is shown in FIG. 4B. GUI 440 is shown to limit the displayed set of available instances to a range of dates 450, for example a range of dates filtered upon or otherwise entered by the customer. In some embodiments, the list of available instances can be filtered by the customer by selecting one or more date/time ranges, e.g., from a calendar, drop down menu or the like. 'Guest' filter 420 allows the customer to filter the instances by the number of guest slots still available in the instance. A 'Time of day' 430 filter allows the customer to filter instances based on the time of day the instances are scheduled. A 'Clear Dates' button 440 can be used to clear a previously established date filter. While three instances are illustrated, in other embodiments, any subset of available instances or a full list of available instances may be displayed. In the exemplary embodiment, the reservation logic 250 may generate this displayed list of instances by obtaining from the experiences database 220 the list of instances ID(s) 226 associated with the experience ID 222 of the experience selected by the customer, and obtaining, from the instances database 230 all instances for which the instance ID 238 conforms to an ID in the set of instance ID(s) 226. Instances may be displayed to the user whether or not an instance is associated with a private bookings enabled flag 235. However, where an obtained instance is associated in database 230 with a flag 236 indicating the instance is private rather than public, the private instance is not displayed to the customer, unless the customer is the entity that booked the private instance.

GUI 440 provides options for the customer from this default screen (or in some embodiments another GUI, screen, or popup interface) to make a request to book one or more instances of the experience as a public or private instance. The interfaces can also display an instance price 472, instance time 470, an instance selection button 474, and/or other relevant information about the instance or the experience (e.g., a description, contact information, location, capacity, etc.). If the instance ID 232 is associated in instances database 230 with a private bookings enabled flag 235, the customer may also be presented (via a screen presented on a customer-facing user interface, or another type of communication such as email, text message or the like) with a private booking link 476 for the instance. In some embodiments, in addition to (or in the alternate to) the flag 235 being set, the private booking link 476 may be displayed if one or more conditions is met. As an example, link 476 may displayed if no other reservations for the instance have been made. Conversely, link 476 may not be displayed if any public bookings of an instance have already been made, even if additional tickets/reservations are available for purchase. For instance, FIG. 4B illustrates, in the bottommost instance in the listing, an availability indication of "2 of 10 spots left". This indicates eight spots have been reserved and therefore a link for private booking of the public instance is not available. In some embodiments, if the only reservations for a particular instance have been made by the same customer as is currently viewing the GUI 330, that customer may still be presented with an option to make that instance private.

If no private bookings enabled flag 228 is set, no express option for private instances is presented to the customer. However, embodiments may exist where the customer is still given an option to make a general indication of interest in an unscheduled and/or private booking. Such requests may cause messages or notifications to be sent by the reservation server 110 to the host device 150, allowing the host to accept, reject, make a counter offer, and/or specify suitable pricing information for the customer to make the private booking. Such pricing information might include, e.g., a flat price for the indicated number of participants or a minimum prices plus a per guest additional price which would apply after a certain number of guests have registered. After the host's response, messages and notifications of a host's acceptance, rejection, or counter offer can then be sent to the requesting customer's device 140. If accepted by the customer, a private flag 236 is set in association with the instance ID 232, altering the experience instance from a public instance that is viewable by all customers to a private instance viewable only the customer. The instance is thereafter removed from the list of publically-available instances or experiences for the period involved or some other indication may be may be used to indicate that the instance is unavailable. Customer information may be collected via the customer-facing user interface 145, the user database 240, one or more third-party servers 120, and/or any appropriate point of data intake, and may be stored as current booking data 237. Server 110 may also transmit one or more messages or notifications to the host and/or the customer, such messages including a hyperlink (or other information) to drive or direct the user to an interface for viewing, editing, or otherwise interacting with the private instance reservation.

With reference to FIG. 4B, if a select button 474 is pressed by the customer, reservation logic 250 may transmit, to customer-facing user interface 145, a private group booking review interface for the instance, drawn from data stored in instances database 230 associated with the instance ID 232 of the clicked-upon instance. In some embodiments, the clicked-upon instance ID may be temporarily stored or cached, in association with the customer's session or profile information on the website or app, either temporarily or until the cache is cleared, or until a new experience instance is selected by the customer.

An exemplary embodiment of a private group booking review interface, GUI 500, is shown in FIG. 5A. The GUI 500 may include controls 510, 512 to adjust the number of guests and/or guest type, as well as display details 515 including the date, time and/or title of the experience instance. The interface may also have controls or fields to display a private group price 520, any additional costs 530, a group reservation total 560, a cancel button 540, and a confirmation button 550, though other configurations and/or points of data input or display can be used in other embodiments. In some embodiments, GUI 500 may also display additional relevant pricing information, such as taxes, service charges/fees, etc.

The displayed prices 530, 520, and 560 are dependent upon the pricing information 234 stored in the instances database 230 in association with the instance ID 232. Using the number of guests entered 510 and/or guest type 512, one or more rules in pricing information 234 may be applied. For instance, the pricing information 234 may set out a minimum private booking price to be applied as the private group price 520. In a case where the total number of guests 510 and/or guests of a particular type 512 exceeds the minimum thresholds set in the pricing information 234, one or more additional costs may be applied. In some embodiments, pricing information 234 may also indicate one more restrictions on guest cancellation, editing, alteration, or the like, for example, setting a no-cancellation policy or setting a date or timeframe during which cancellation or alteration is permitted.

In other embodiments, where the private booking is for a future date/time than the time the booking is being made, the price of the private booking may be subject to change. As one example, as shown in FIGS. 5B-5D, the total price can be updated by reservation logic 260 as the number of guests is changed. In the example of FIG. 5B, the customer has initiated a private booking for two guests, with guest type adult. The reservation logic, using pricing information 234 for the instance, determines whether any additional pricing rules would apply to raise the total above the minimum cost of $200. In one embodiment, the reservation logic 250 uses a maximum number of guests defined by the host and set in the pricing information. In other embodiments, the reservation logic calculates a public booking value for the total number and type of guests for the private event, here two adult guests, corresponding to the hypothetical price that a customer would pay if they were reserving seats for the listing as a public booking. Assuming, for example, the public cost is $60 per adult guest, the reservation logic 250 determines that the public booking value (here, $120) has not exceeded the private booking minimum 520 (here, $200), and no additional costs 530 need be applied. Similarly, FIG. 5C illustrates a scenario where the private reservation has been modified to add one adult guest, resulting in a total of three adult guests. If the number of adult guests does not exceed a set threshold maximum for the minimum price, or if the reservation logic 250 determines that the public booking value (here, $180) has not exceeded the private booking minimum 520 (here, $200), and no additional costs 530 need be applied, and the total remains at $200.

FIG. 5D illustrates a scenario where the private reservation has been modified to add one more adult guest, resulting in a total of four adult guests. Reservation logic 250 may determine that the public booking value (here, $240) exceeds the private booking minimum 520 (here, $200). In an alternative example, the number of guests may be found to exceed a set threshold maximum for adults. In either example, as a result, the reservation logic 250 may add as additional costs 530 the amount necessary to make up the difference between the private booking minimum and the public booking value, here $40. The total 560 therefore is adjusted to $240. In another embodiment, the reservation logic 250 may apply one or more stored pricing rules in pricing information 234, which rules may define a set per person additional cost that would be applied as the additional cost 530. In still other embodiments, the additional costs may correspond to the public per person cost, in this example, $60. In any of the disclosed embodiments, changes made to the reservation by the customer may be stored in the current booking data 237 in association with the instance in instance database 230. Embodiments may also exist where the customer edits the experience to remove or reduce the number of guests, in which case a similar calculation may be done, and the total may be reduced from a value higher than the private booking minimum to, at lowest, the private booking minimum. Where the customer has already paid the total cost, a partial refund may be issued to the customer via one or more payment systems (not shown).

As discussed above, the pricing rules set by the host for private instance reservations may reach a total cost by first applying a minimum price, and once that minimum has been exceeded, applying one or more guest-dependent fees. In one embodiment, the post-minimum per guest fee may increase in a linear manner, with a standard cost per guest (in a similar manner as a public ticketed experience). Alternatively, the per guest fee may increase inconsistently, with a varying cost depending on guest type (ranging from $0 to any appropriate positive monetary value). In still other embodiments, other private booking pricing models may exist for private bookings. For instance, after a minimum price has been exceeded, tiered pricing may be applied, where the price changes in a step like function according to the number of guests participating (e.g., for 1-4 guests the price is $200, for 4-8 guests the price is $600, and for 8-12 guests the price is $400). In some embodiments, the pricing rules may advance in differently tiered, or differently leveled steps, depending on the types of users to be added, such that differently-typed guests raise a total amount by a different per guest cost. In some embodiments, pricing rules may include options causing the overall price to decrease (e.g., volume price discounts), e.g., by adding a bulk rate or other discount. In some embodiments, different minimum prices for private booking may be applied for different types of users (e.g., children or adults, a group from a particular organization or affiliation, etc.). By these means, the host can offer instance-specific and user-specific discounts where appropriate, and/or recoup costs for additional resources, personnel, or the like that are needed based on the types of guests attending the experience.

Figure 6:
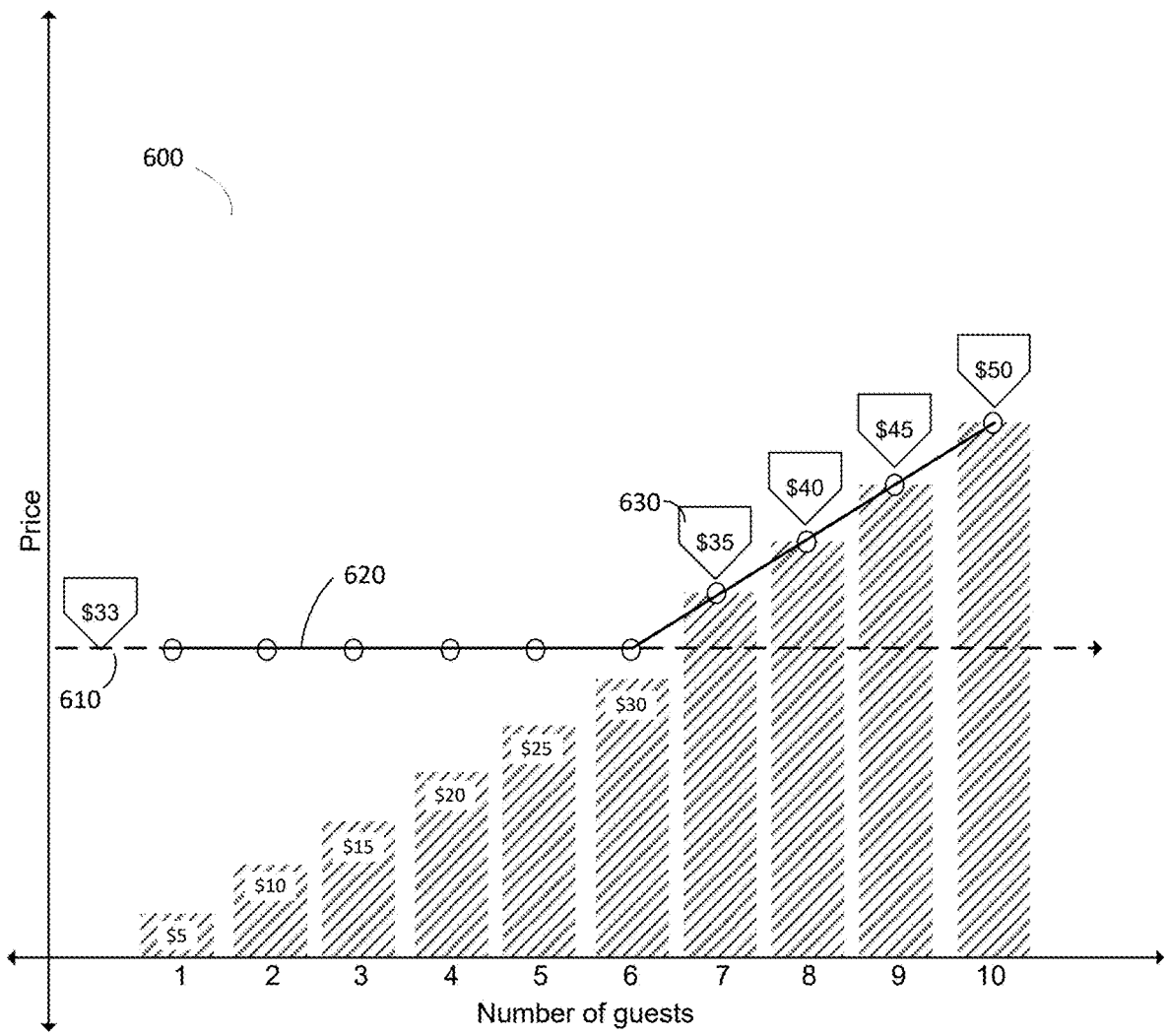
FIG. 6 is a chart of an exemplary pricing model in accordance with some embodiments of the present disclosure.

FIG. 6 is an example of a pricing chart 600 for the booking of a private instance. In this exemplary embodiment, a minimum private booking price of $33 is set for the experience. Given a number of guests (and in some embodiments, a number of each respective type of guest), the specified pricing rule for the instance applies the greater of the public booking value (the hypothetical price that a customer would pay if they were reserving seats/tickets for the listing on a per guest basis as a public booking), with a per guest price of $5, and the minimum private booking price. Minimum indicator 610 (dashed line) indicates the minimum price of $33 for booking a private instance of the given example instance. Each circle (connected by solid line 620) indicates the price that the customer would pay for a private reservation of the instance with the specified number of guests. As be seen, the minimum cost $33 is paid until the per guest cost would otherwise exceed the minimum threshold 610. In FIG. 6, this happens at point 630 when the reservation is for seven guests. After point 630, the total cost for the private booking rises linearly, at a set per person addition. In some embodiments, a pricing chart can be displayed, via customer-facing user interface 145, to the customer so they can easily perceive how the price changes with different number of guests. In some embodiments, similar charts may be made available to hosts, via host-facing user interface 155, to help them easily perceive the effects of the pricing rules before they are set.

Figure 7:
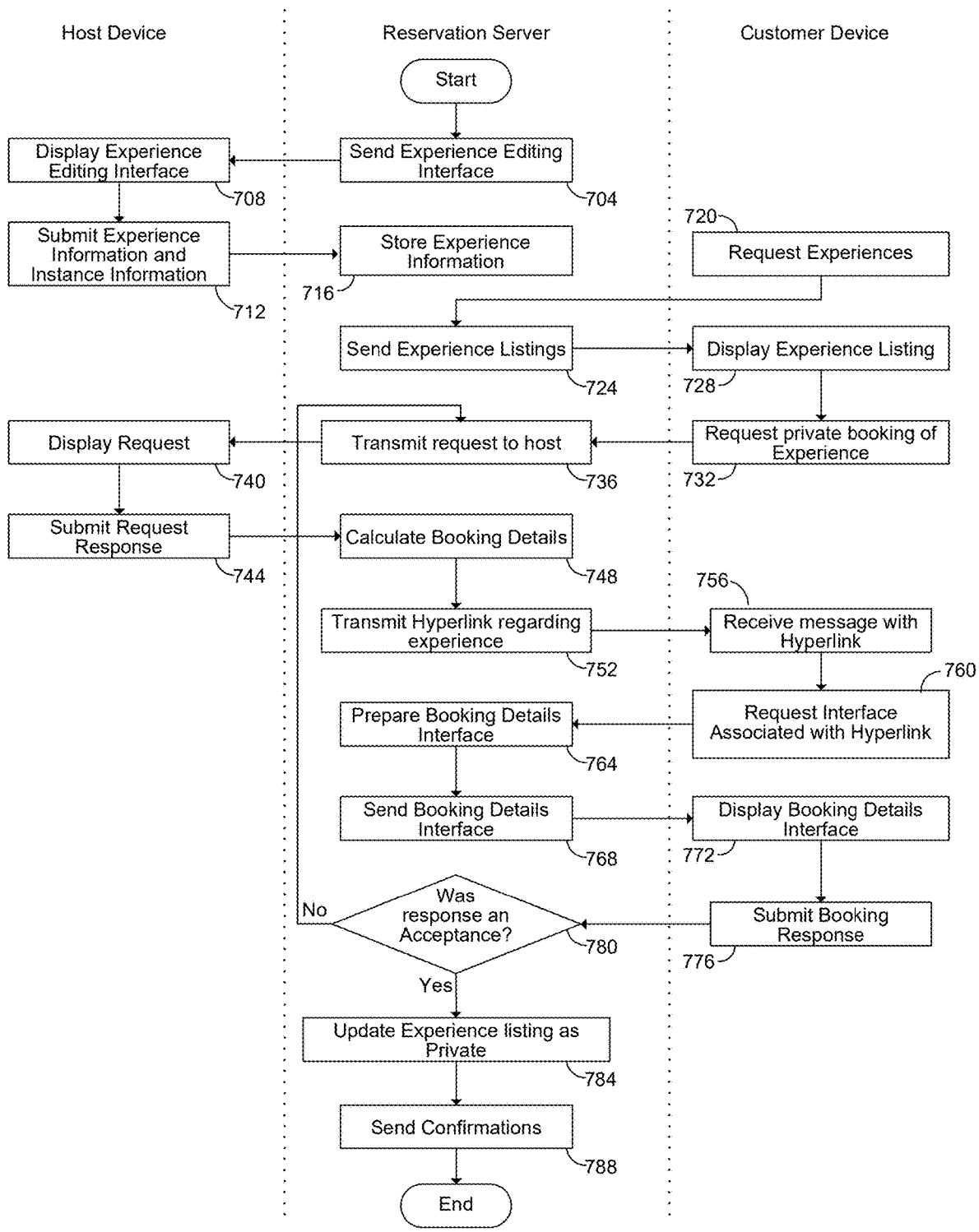
FIG. 7 is a flow chart of an exemplary process for making a private reservation of a publically offered reservable experience in accordance with some embodiments of the present disclosure.

FIG. 7 is a flow chart illustrating a method for privately reserving a publicably offered experience instance. The process starts at step 704 with the creation of an experience record. The reservation server 110 sends an experience creation interface (step 704) to the host device 150, which in turn displays the interface to the host (step 708). The host enters or otherwise provides various information about the experience that may include images, descriptions, pricing information (potentially including multiple sets of pricing rules, e.g., regular pricing, holiday pricing, private pricing, etc.), availability information, and various other details. The host may also define one or more publicly-bookable instances of that experience, each associated with a specific date/time, or a range of dates/times. When the host submits experience information and/or associated instance information in step 712, that information is transferred from the host device 150 to the reservation server 110, and stored in experiences database 220 and/or instances database 230. The offered experiences data 247 is also updated in host database 240. A similar process may be used for editing, updating, and adding new information regarding the experience.

A customer device 140 may request, in step 720, experience information via a search or search through customer-facing user interface 145. The requested experience information may include information regarding a specific experience or a list of experiences. Such requests may include customer-input filter or search data to narrow the listings returned, though in some embodiments, reservation server 110 may filter the experience results based on information associated with the customer in user database 240 and/or historical information. In an exemplary embodiment, the reservation server 110 does not display any experiences for which the only associated instance information (in instances database 230) has set a private flag 236, indicating that the instance is already booked privately and/or no public instances are available. The reservation server 110 sends information regarding one or more experience listings to the customer device 140 and/or associated information in experiences database 220 in step 724. After receiving the experience listings information, the customer device 140 displays the one or more experience listings to the customer via customer-facing user interface 145 in step 728. The steps of requesting listings 720, sending listings 724, and receiving listings 728 may be repeated by the customer through the customer device 140 until the customer finds an experience they are interested in.

A customer, finding an experience they are interested in, may request in step 732 a private instance of the experience, either requesting an existing public instance with no reservations by other users be made private or requesting a new private instance of the experience be created. When a customer requests a private instance of an experience (whether or not such request is associated with a preexisting experience instance created by the host), a pending instance is created, and a temporary instance ID may be generated and stored in instance database 230 and experiences database 220 (in association with the selected experience).

A message is sent to the host-facing user interface 155 in step 736, alerting the host to the customer interest in a private booking. In some embodiments, this message may alternatively be sent via email, instant messaging, or other type of electronic communication, or via voice, SMS, voicemail, or any other appropriate type of communication. Such a message may include time and date information for the instance (in some cases, a date/time proposed by the customer). This request may include the number of guests (and/or the number of each type of guest) to participate in the private experience. The message may include a specialized link that, when clicked (or otherwise interacted with) by the host, can direct the host to an instance scheduling screen showing information for private booking.

In one embodiment, prior to sending a message to the host, the reservation logic 250 compares the details of the pending instance booking against the host's other pending and finalized instances (stored in instances database 230 in association with experience-identifying information, such as an experience ID, in experiences database 220 and host database 245) to ensure there are no conflicts. For instance, conflicts may arise where two instances overlap in a targeted date/time, if the number of type of guests violates defined rules set by the host, by one or more local or regulatory rules (e.g., venue limitations), and the like. If there are conflicts, the proposed private instance as well as potential conflict information may be relayed to the host via the transmitted message. In other embodiments, if conflicts arise, the customer may not be permitted to submit the booking request to the host, and may instead be prompted to modify one or more characteristics of the request (e.g., date time, guest number or type, etc.) and resubmit such request.

The instance scheduling screen with the request information is displayed to the host in step 740. If the customer proposed a time and date then the instance scheduling screen may display an instance for, as a default, the proposed time and date. The instance scheduling screen may also display any notes or requests from the customer. These messages and screens may also include pricing details for the instance.

In step 744, if the host accepts the details requested (e.g., time and date and price details) by the guest the pending instance is finalized. The host may be able to modify the time and date requested by the customer and add notes to the request response. The host may also be able to select and include predefined pricing rules or may specify pricing rules specific to this instance.

Upon submission of the request response, booking details for the private booking are calculated (step 748) and a message is sent to the customer (step 752) including a link. The customer receives the message with the hyperlink (step 756), and clicks or otherwise interacts with the hyperlink (step 760), bringing the customer to a instance-specific interface with booking details (steps 764, 768), allowing the customer to accept the changes, reject the counter offer, or make changes of their own to be sent back the host.

The customer device displays the interface with the booking details (step 772), and allows the customer to submit a booking response (step 776), during which process the customer may accept/decline any changes made by the host. If the changes are accepted (Yes in step 780), then the pending private instance is finalized. If the customer makes changes (No in step 780), the changes are transmitted to the host for review (Step 736) and the process of negotiation can be repeated as necessary until the request is finally rejected or accepted.

In some embodiments, the specialized instance-specific links for the customer and the host are also user-specific, such that if the links were forwarded or used by another user of the server 110, the resultant interface would not display the pending instance information. By these means, other users and customers may not view the private instance information for an experience. In some embodiments, the instance-specific and user-specific links can be limited to the intended users/instances based on login information of the host and/or customer, session information, device information, GPS/location information, password/biometric information, or any other appropriate method of limitation. In some embodiments, an unintended user, if they intend to access the link, may instead be directed to a default page or an error page, or a page for public booking of the experience with which the privately booked instance is associated. The specialized link would include information sufficient to associate the link to the proposed private instance ID in instances database 230 (e.g., an instance identifier or a uniquely, automatically, or randomly generated character string, or the like).

Figure 8:
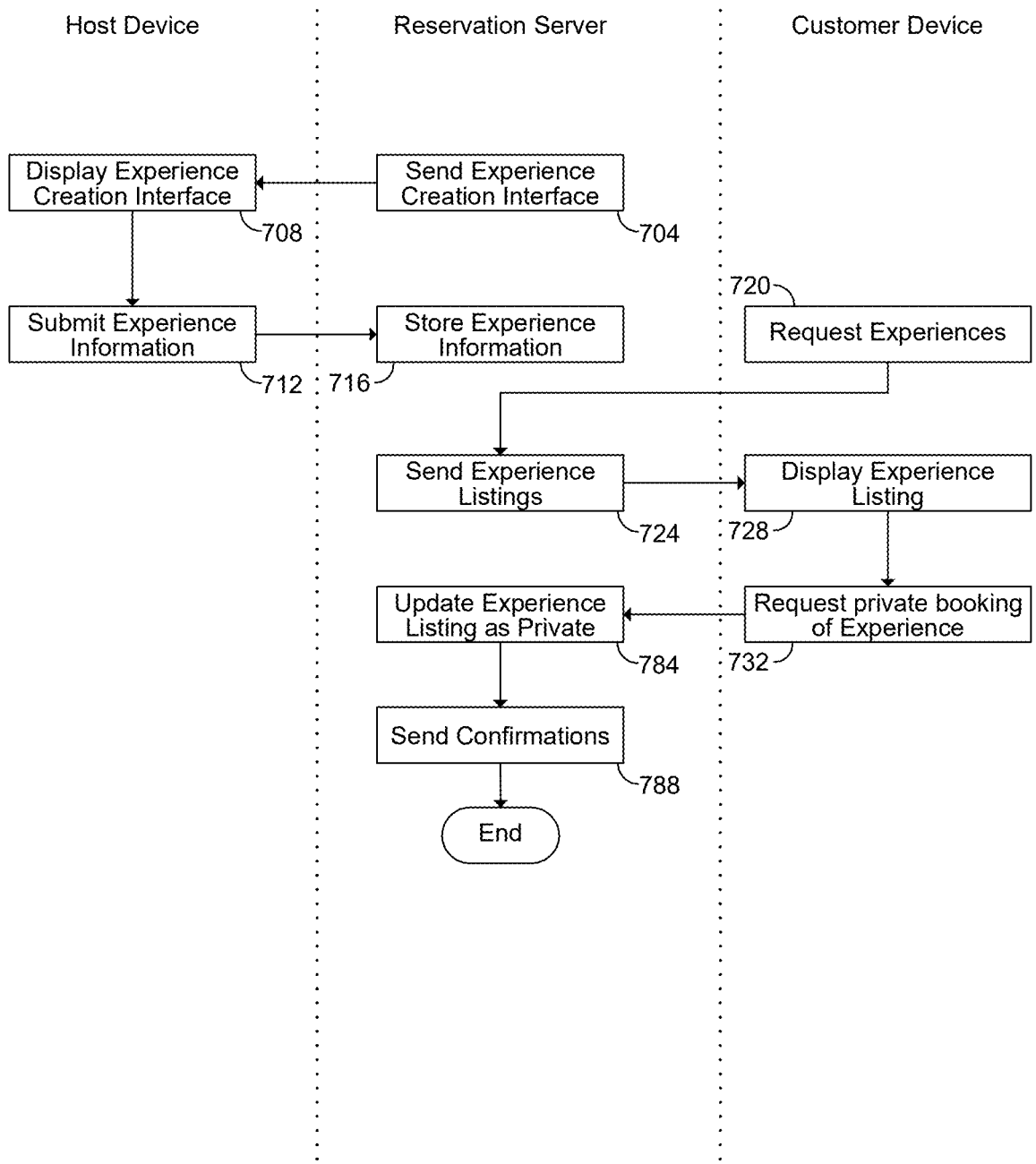
FIG. 8 is a flow chart of an exemplary process for making a private reservation of a publically offered ticketed experience with some embodiments of the present disclosure.

In some embodiments, when the host creates an instance (step 712), the host may set a private bookings enabled flag 235 in database 230 indicating that private bookings are available, and may store pricing information 234 related to such private bookings. When the host specifies this private booking pricing information 234 for an available instance in advance, an expedited process becomes possible, as shown in exemplary FIG. 8. Steps 704-712, 724, and 728 may be understood to be similar to those described with reference to FIG. 7. In the embodiment of FIG. 8, the information submitted to the reservation server 110 (step 716) includes some indication of experience availability and pricing information regarding making a private booking of the previously public instance. In displaying information regarding an instance of an experience (step 728), pricing information for private booking of the instance can be obtained from the information 234 stored in the instance database 230 in association with instance of the experience. The customer, having access to such information, can indicate the number of guests (and/or type of guests) attending the experience as part of the submitted request (step 732) for changing the booking from a public instance to a private instance. The submitted request (step 732) can be understood as an acceptance of the pricing rules set out by the pricing information 234 for that instance. In step 784, the reservation server 110 can directly update the instance as private by setting the public/private flag 236 from a public value to a private value. The reservation logic 250 may then send confirmations to both the host-facing user interface 155 and the customer-facing user interface 145 in step 788.

In some embodiments, along with or after transmitting confirmation to the customer, the reservation server 110 may additionally transmit to the customer-facing user interface 145 a listing of one or more experiences that are related or complementary to the experience privately booked by the user. In some embodiments, the listing of related or complementary experiences may be filtered based on a proximity of date/time to the booked private listing, with or without overlapping such instance in date and/or time. In some embodiments, the listing of related or complementary experiences may be filtered based on a category of experience and/or one or more conditions or information obtained from the user profile or activity data 244 stored in user database 240. In some embodiments, complementary experiences may be designated or identified by the host and stored in association with the experience in database 220. In some embodiments, if the customer were to book or view a suggested complementary experience, the customer may be able to obtain a preferential or discounted price on that experience, such pricing being stored, e.g., as a unique pricing rule in instances database 230 for the complementary experience.

In some embodiments, a public instance may remain available for other guests to book a reservation while a customer and a host are negotiating changing the public booking instance to a private booking instance. In such cases, other guests could book a reservation for the instance in the intervening time. Such reservations would prevent the reservation logic 250 from taking the public instance private. In some embodiments, other guest wanting to place a reservation for a public instance that has been put on hold may request to be put on a waiting list for that particular instance.

In some embodiments, a customer who has made a booking of a subset of slots for a publicly-available instance (for which the public/private flag 236 is set to public) may be given an option to alter the instance from a public instance to a private instance. For example, a scenario may exist where an insufficient number of guests have made bookings of a public experience, such that the host may be motivated to cancel the experience or else sustain a monetary loss. In such a scenario, rather than delete or cancel the instance (thus removing the instance from instances database 230), the host may be presented, by reservation logic 250, an option to transmit, to the customer who has made the booking of the subset of seats, an invitation to modify the instance from a public instance to a private instance. In such an embodiment, the host may, prior to transmitting the invitation to the customer, set a specific set of pricing information 234 for the instance. For instance, the host may set a private booking minimum cost 234 that is lower or otherwise different than the private booking minimum cost stored in database 230 or offered for an instance of the same experience (or an analogous experience) at a similar or analogous date/time, in order to offer a deal to the customer while still mitigating or reducing the host's monetary loss.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

Now, therefore, the following is claimed:

1. A computer-implemented method for arranging the reservation of a host-offered event, the method comprising:
    transmitting, to a host-facing computing device associated with a host of an event, a first graphical user interface allowing the input of information corresponding to the event;
    storing, in a database memory, based on the information corresponding to the event, an event listing;
    storing, in the database memory, in association with the event listing, a plurality of pricing rules, wherein a first pricing rule of the plurality of pricing rules identifies a first minimum reservation cost and a first additional reservation cost, the first additional reservation cost being a per person cost, and wherein a second pricing rule of the plurality of pricing rules identifies a second minimum reservation cost and a second additional reservation cost;

transmitting, to a guest computing device associated with a guest, a second graphical user interface displaying information identifying the event listing;

receiving, from the guest computing device, via the second graphical user interface, a request for a private booking option for the event listing;

transmitting, to the host-facing computing device, the request for the private booking option for the event listing;

receiving, from the host-facing computing device, a response to the request for the private booking option, wherein the response indicates one of the first pricing rule or the second pricing rule of the plurality of pricing rules stored in the database memory in association with the event listing;

obtaining, from the database memory, the minimum reservation cost identified by the specified pricing rule;

calculating, based on the obtained minimum reservation cost, a total booking cost for the private booking option using a flexible pricing algorithm;

transmitting, to the guest computing device, a unique hyperlink associated with the private booking option for the event listing, wherein access to a graphical user interface corresponding to the unique hyperlink is limited to the guest computing device, wherein the unique hyperlink is generated based on a combination of an event identifier associated with the event listing and a session identifier associated with the guest computing device;

receiving, from the guest computing device, a request to access a third graphical user interface associated with the unique hyperlink, wherein access to the third graphical user interface is limited by the computer system to the quest computing device based on the session identifier;

transmitting, to the guest computing device, the third graphical user interface, wherein the third graphical user interface displays the total booking cost and allows the guest to input a number of guests attending the event;

calculating an updated total booking cost based on the inputted number of guests attending the event and one or more of: the minimum reservation cost and the additional reservation cost identified by the specified pricing rule using the flexible pricing algorithm;

transmitting, to the guest computing device, in response to the input of the number of guests attending the event, the updated total booking cost;

storing, in the database memory, in association with the event listing, a flag designating the event listing as privately booked; and updating the database memory to remove the event listing from publicly available listings.

2. The method of claim 1, wherein the third graphical user interface allows the guest computing device to input one or more types of guests attending the event, and for each of the one or more types of guests, a respective number of guests, and wherein the calculating of the updated total booking costs comprises:

determining, for each of the respective types of guests attending the event, whether the number of that type of guest exceeds a set threshold value stored in the database memory;

selecting, from the plurality of pricing rules, an updated pricing rule to be used in accordance with the determination;

obtaining, from the database memory, an updated minimum reservation cost identified by the updated pricing rule; and calculating, based on the updated minimum reservation cost, the updated total booking cost for the private booking option.

3. The method of claim 1, wherein the third graphical user interface allows the guest to input one or more types of guests attending the event, and for each of the one or more types of guests, a respective number of guests, and wherein the calculating of the updated total booking costs comprises:

obtaining, from the database memory, for each of the one or more types of guests, an associated per guest cost;

calculating an intermediate total booking cost based on, for each of the one or more types of guests, the inputted number of guests and the obtained associated per guest cost;

determining whether the intermediate total booking cost exceeds a minimum reservation cost stored in the database memory in association with the selected pricing rule;

selecting, from the plurality of pricing rules, an updated pricing rule to be used in accordance with the determination;

obtaining, from the database memory, an updated minimum reservation cost identified by the updated pricing rule; and calculating, based on the updated minimum reservation cost, the updated total booking cost for the private booking option.

4. The method of claim 1, wherein the third graphical user interface allows the guest computing device to input a guest type attending the event, the guest type being one of: adults, children, seniors, students, pets, or organization member.

5. The method of claim 1, wherein the second additional reservation cost is a per group cost.

6. The method of claim 1, wherein the first pricing rule is associated with a first date/time value, and the second pricing rule is associated with a second date/time value different from the first date/time value.

7. The method of claim 1, further comprising:

receiving, from the guest computing device, a second request to access the third graphical user interface associated with the hyperlink;

transmitting, to the guest computing device, the third graphical user interface, wherein the third graphical user interface displays the updated total booking cost and allows the guest computing device to input an updated number of guests attending the event;

calculating a second updated total booking cost based on the inputted updated number of guests; and transmitting, to the guest computing device, in response to the input of the updated number of guests, the second updated total booking cost.

8. The method of claim 1, further comprising:

receiving, from the guest, a request to cancel a booking of the event listing; and updating, in the database memory, in association with the event listing, the flag designating the event listing as being privately booked to a flag designating the event listing as being publicly available for booking.

9. The method of claim 1, wherein access to the graphical user interface corresponding to the hyperlink is limited to the guest computing device, based on login information of the guest, session information, device information, GPS/location information, password and/or biometric information.

10. The method of claim 1, further comprising:
after an unintended user selects the hyperlink, directing the user to a default page, an error page, or a page for public booking of the event listing.

11. The method of claim 1, wherein the total booking cost for the private booking option is calculated further based on a weighted analysis of information derived from one or more of: the host's other offered experiences, other private experiences sharing a geographic location as the event listing, other private experiences sharing date/time characteristics as the event listing, other private experiences sharing an experience type with the event listing, popular or average pricing information for private experiences, and/or other private experiences booked by the guest or by other guests sharing one or more user characteristics with the guest.

12. The method of claim 1, further comprising:
caching, in a temporary memory associated with the guest computing device, information related to the event listing and the private booking option;
detecting a session timeout or a selection of a different event listing by the guest computing device; and
in response to the detected session timeout or the selection of the different event listing, clearing the cached information from the temporary memory associated with the guest computing device.

13. An event reservation system comprising:
a database memory configured to store, in association with an event listing for an event, (a) a plurality of pricing rules, wherein a first pricing rule of the plurality of pricing rules identifies a first minimum reservation cost and a first additional reservation cost, the first additional reservation cost being a per person cost, and wherein a second pricing rule of the plurality of pricing rules identifies a second minimum reservation cost and a second additional reservation cost, and (b) a flag designating the event listing as being publicly available for booking; and
at least one processor configured to:
transmit, to a computing device associated with a user, a first graphical user interface displaying information identifying the event listing;
receive, from the computing device associated with the user, via the first graphical user interface, a request for a private booking option for the event listing, the request comprising a number of guests attending the event;
obtain, from the database memory, one of the first pricing rule or the second pricing rule of the plurality of pricing rules stored in association with the event listing, based on the number of guests attending the event;
obtain, from the database memory, the minimum reservation cost identified by the obtained pricing rule;
calculate, based on the obtained minimum reservation cost, a total booking cost for the private booking option using a flexible pricing algorithm;
transmit, to the computing device associated with the user, a unique hyperlink associated with the private booking option for the event listing, wherein access to a graphical user interface corresponding to the unique hyperlink is limited to the computing device associated with the user, wherein the unique hyperlink is generated based on a combination of an event identifier associated with the event listing and a session identifier associated with the guest computing device associated with the user;
receive, from the user, a request to access a second graphical user interface associated with the unique hyperlink, wherein access to the second graphical user interface is limited by the computer system to the computing device associated with the user based on the session identifier;
transmit, to the computing device associated with the user, the second graphical user interface, wherein the second graphical user interface displays the total booking cost and allows the user to input an updated number of guests attending the event;
calculate an updated total booking cost based on the inputted updated number of guests and one or more of: the minimum reservation cost and the additional reservation cost identified by the obtained pricing rule using the flexible pricing algorithm;
transmit, to the computing device associated with the user, in response to the input of the updated number of guests attending the event, the updated total booking cost; and
update, in the database memory, in association with the event listing, the flag designating the event listing as being publicly available for booking to a flag designating the event listing as being privately booked.

14. The event reservation system of claim 13, wherein the second graphical user interface allows the user to input one or more types of guests attending the event, and for each of the one or more types of guests, a respective number of guests,
wherein the calculating of the updated total booking costs comprises:
determining, for each of the respective types of guests attending the event, whether the number of that type of guest exceeds a set threshold value stored in the database memory;
selecting, from the plurality of pricing rules, an updated pricing rule to be used in accordance with the determination;
obtaining, from the database memory, an updated minimum reservation cost identified by the updated pricing rule; and
calculating, based on the updated minimum reservation cost, the updated total booking cost for the private booking option.

15. The event reservation system of claim 13, wherein the second graphical user interface allows the user to input one or more types of guests attending the event, and for each of the one or more types of guests, a respective number of guests, and
wherein the calculating of the updated total booking costs comprises:
obtaining, from the database memory, for each of the one or more types of guests, an associated per guest cost;
calculating an intermediate total booking cost based on, for each of the one or more types of guests, the inputted number of guests and the obtained associated per guest cost;
determining whether the intermediate total booking cost exceeds a minimum reservation cost stored in the database memory in association with the obtained pricing rule;
selecting, from the plurality of pricing rules, an updated pricing rule to be used in accordance with the determination;

obtaining, from the database memory, an updated minimum reservation cost identified by the updated pricing rule; and calculating, based on the updated minimum reservation cost, the updated total booking cost for the private booking option.

16. The event reservation system of claim 13, wherein the second graphical user interface allows the user to input a guest type attending the event, the guest type being one of: adults, children, seniors, students, pets, or organization member.

17. The event reservation system of claim 13, wherein the second additional reservation cost is a per group cost.

18. The event reservation system of claim 13, wherein the first pricing rule is associated with a first date/time value, and the second pricing rule is associated with a second date/time value different from the first date/time value.

* * * * *